(12) United States Patent  
Orio et al.

(10) Patent No.: US 12,488,720 B2
(45) Date of Patent: Dec. 2, 2025

(54) DEVICE AND METHOD FOR IMAGE PROCESSING IN A DISPLAY DRIVER

(71) Applicant: Synaptics Incorporated, San Jose, CA (US)

(72) Inventors: Masao Orio, Tokyo (JP); Takashi Nose, Kanagawa (JP); Hirobumi Furihata, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 238 days.

(21) Appl. No.: 18/211,558

(22) Filed: Jun. 19, 2023

(65) Prior Publication Data

US 2023/0377502 A1 Nov. 23, 2023

Related U.S. Application Data

(63) Continuation of application No. 17/389,843, filed on Jul. 30, 2021, now abandoned, which is a continuation of application No. 16/778,614, filed on Jan. 31, 2020, now Pat. No. 11,094,240.

(51) Int. Cl.
G09G 3/20 (2006.01)
G06F 3/01 (2006.01)

(52) U.S. Cl.
CPC .......... G09G 3/2003 (2013.01); G06F 3/013 (2013.01); *G09G 2300/0452* (2013.01); *G09G 2320/0242* (2013.01); *G09G 2320/0261* (2013.01); *G09G 2320/041* (2013.01); *G09G 2354/00* (2013.01); *G09G 2360/144* (2013.01); *G09G 2380/02* (2013.01)

(58) Field of Classification Search
CPC .......... G09G 3/2003; G09G 2320/041; G09G 2320/0261; G09G 2360/144; G09G 2320/0242; G09G 2354/00; G09G 2380/02; G09G 2300/0452; G06F 3/013
See application file for complete search history.

(56) References Cited

U.S. PATENT DOCUMENTS

| 5,710,876 | A | * | 1/1998 | Peercy | G06T 15/506 |
| | | | | | 345/426 |
| 7,202,458 | B2 | | 4/2007 | Park | |
| 8,384,829 | B2 | | 2/2013 | Yamashita | |
| 9,478,157 | B2 | * | 10/2016 | Wu | G09G 5/02 |
| 9,734,635 | B1 | * | 8/2017 | Gorumkonda | H04N 23/63 |
| 9,754,522 | B2 | | 9/2017 | Park | |
| 10,163,408 | B1 | * | 12/2018 | Chen | G09G 3/36 |

(Continued)

FOREIGN PATENT DOCUMENTS

| CN | 104795032 A | 7/2015 |
| CN | 105474260 A | 4/2016 |

(Continued)

*Primary Examiner* — Bryan Earles

(74) *Attorney, Agent, or Firm* — Leydig, Voit & Mayer, Ltd.

(57) ABSTRACT

A display driver comprises image processing circuitry and driver circuitry. The image processing circuitry is configured to receive spatial distribution information of a physical quantity related to a display panel. The image processing circuitry is further configured to generate output voltage data by processing input pixel data associated with subpixels of the pixel. The drive circuitry is configured to drive the display panel based on the output voltage data.

19 Claims, 33 Drawing Sheets

(56) References Cited

U.S. PATENT DOCUMENTS

| | | | |
|---|---|---|---|
| 2005/0212728 A1* | 9/2005 | Miller | G09G 3/2003 345/76 |
| 2007/0159448 A1* | 7/2007 | Inuzuka | G09G 3/3413 345/102 |
| 2008/0245949 A1* | 10/2008 | Morimoto | G01J 1/32 250/205 |
| 2011/0199350 A1* | 8/2011 | Wilson | G09G 5/02 345/207 |
| 2013/0257887 A1* | 10/2013 | Xu | G09G 5/10 345/589 |
| 2014/0016880 A1* | 1/2014 | Kerofsky | G09G 3/3406 382/274 |
| 2014/0306985 A1 | 10/2014 | Jeong | |
| 2015/0109320 A1 | 4/2015 | Yata et al. | |
| 2015/0194091 A1* | 7/2015 | Tusch | G09G 3/3283 345/77 |
| 2017/0221433 A1* | 8/2017 | Harada | G09G 3/3413 |
| 2018/0137801 A1 | 5/2018 | An | |
| 2019/0051230 A1 | 2/2019 | Jeon | |
| 2020/0014897 A1* | 1/2020 | Kim | H04N 9/77 |
| 2020/0066219 A1 | 2/2020 | Hsu | |

FOREIGN PATENT DOCUMENTS

| | | |
|---|---|---|
| CN | 107272198 A | 10/2017 |
| CN | 108109599 A | 6/2018 |

\* cited by examiner

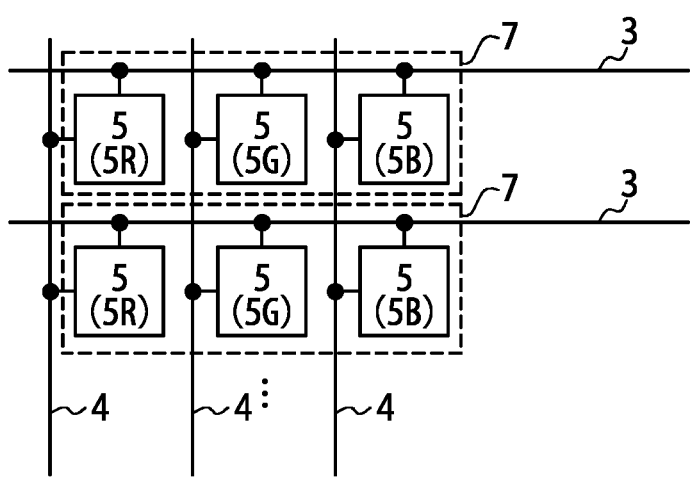
F I G. 2

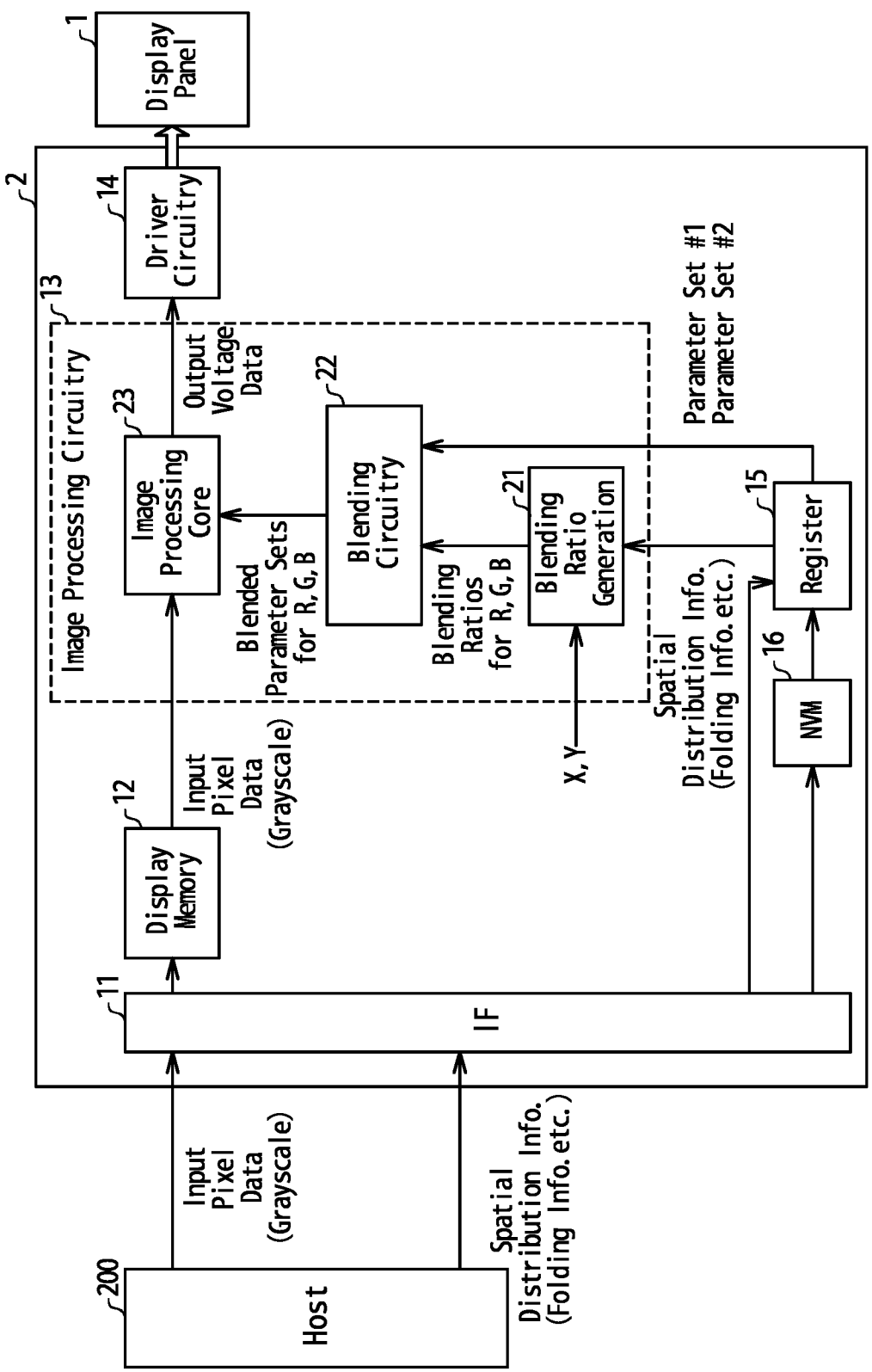
F I G. 3

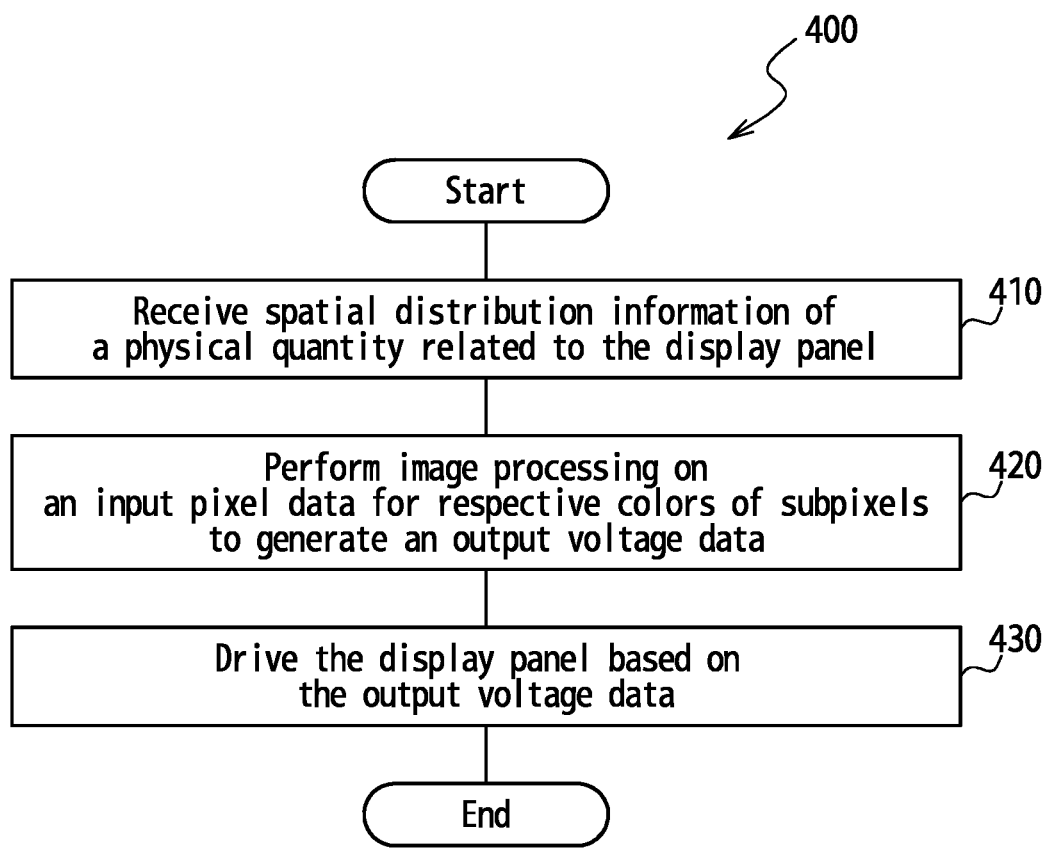

F I G. 8
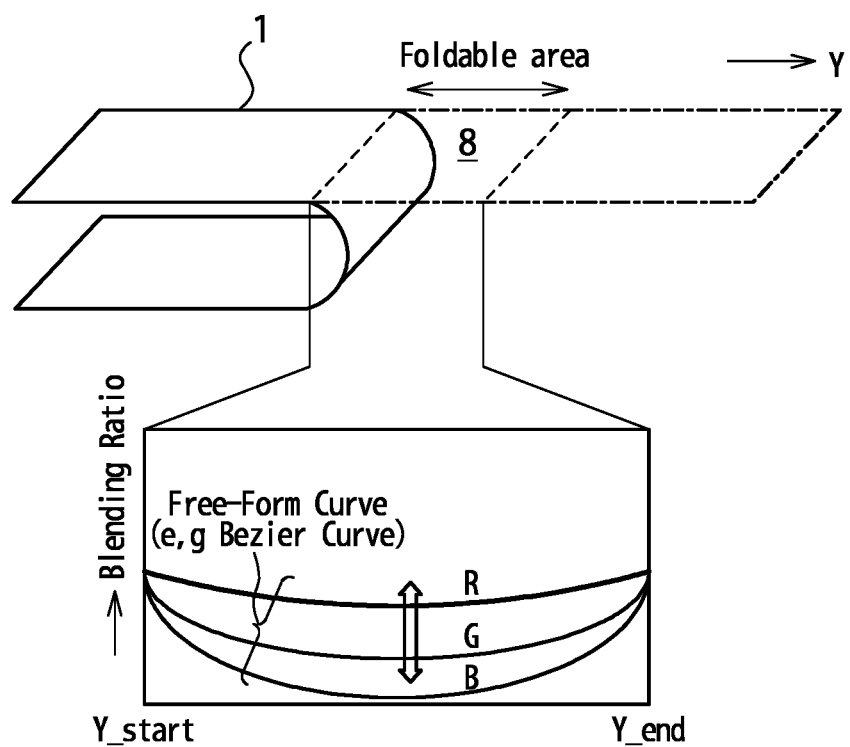

FIG. 22
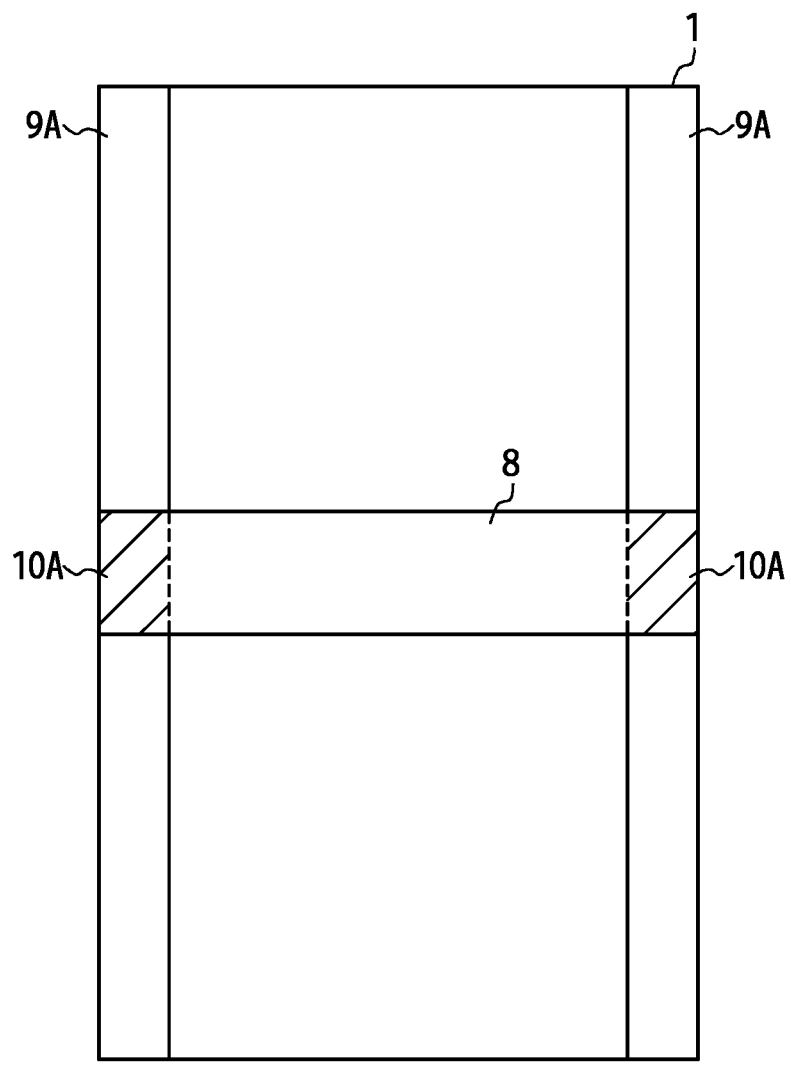
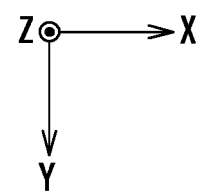

FIG. 24
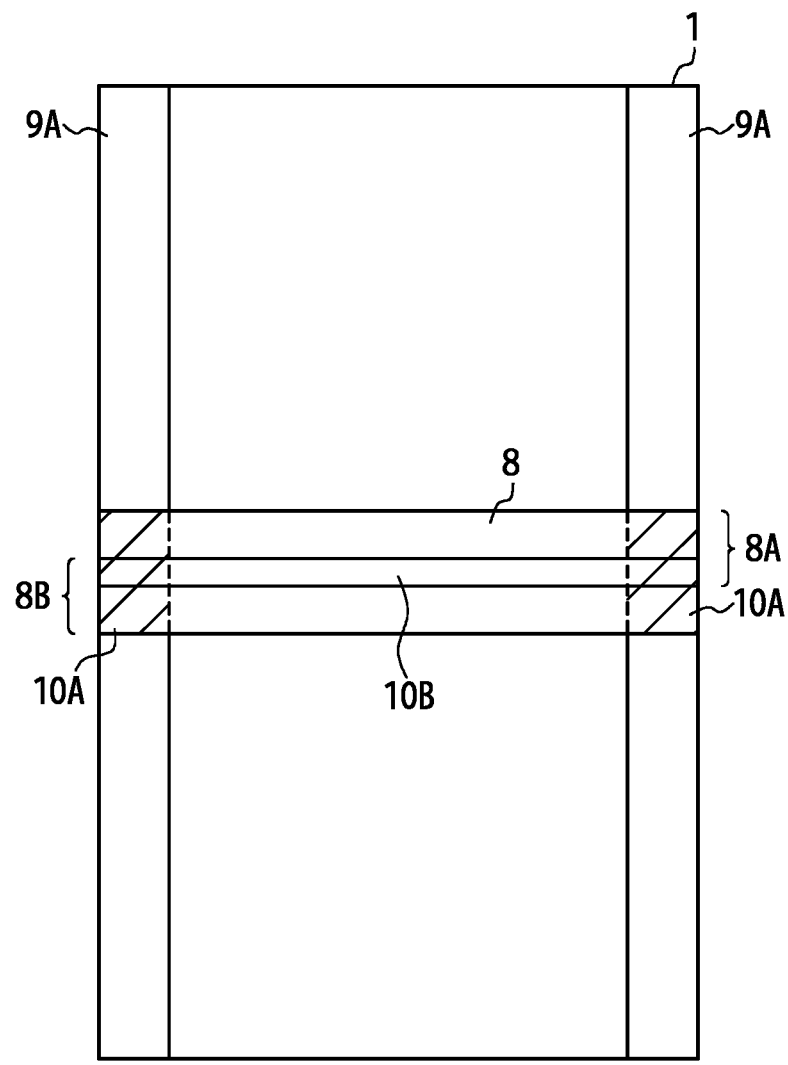
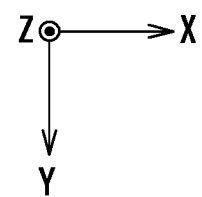

FIG. 26
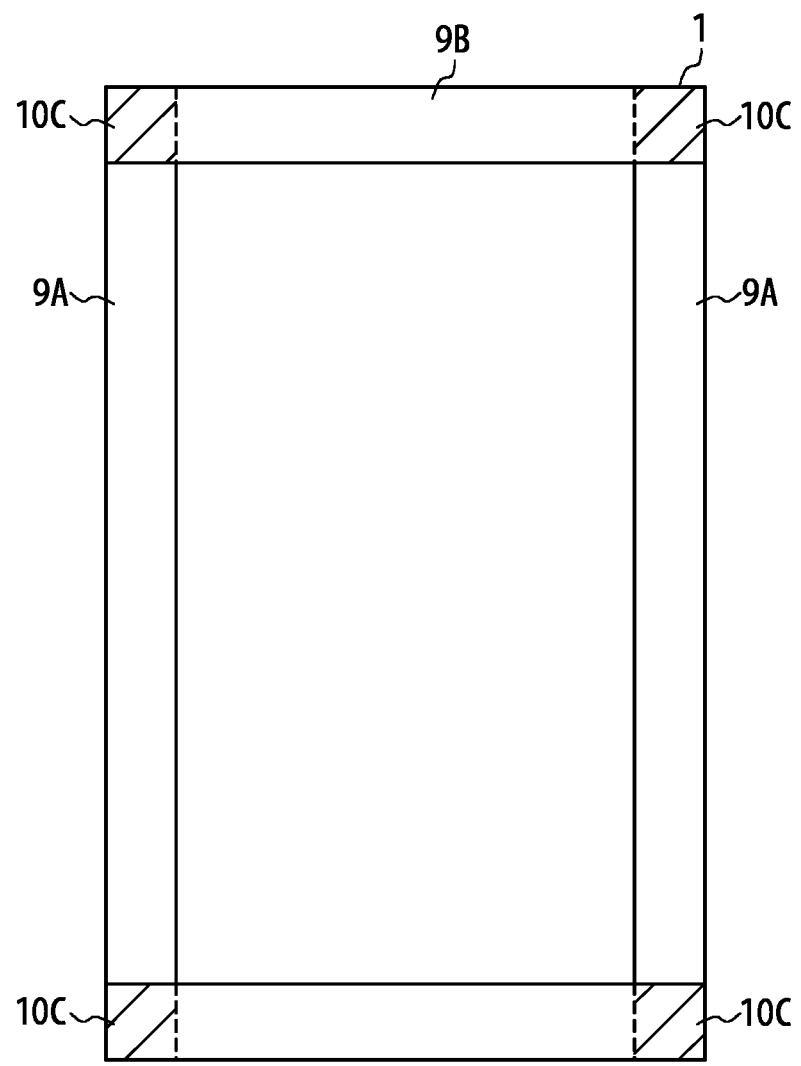
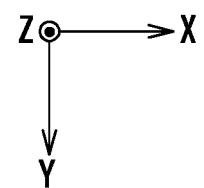

DEVICE AND METHOD FOR IMAGE PROCESSING IN A DISPLAY DRIVER

CROSS REFERENCE TO RELATED APPLICATIONS

This application is a continuation application of, and thereby claims benefit under 35 U.S.C. § 120 to, U.S. patent application Ser. No. 17/389,843 filed on Jul. 20, 2021. U.S. patent application Ser. No. 17/389,843 is a continuation application of, and thereby claims benefit under 35 U.S.C. § 120 to, U.S. patent application Ser. No. 16/778,614 filed on Jan. 31, 2020.

BACKGROUND

Field

Embodiments disclosed herein relate to image processing techniques for a display driver.

Description of the Related Art

Image processing techniques may be applied to image data to improve the image quality of the image displayed on a display panel such as an organic light emitting diode (OLED) display panel and a liquid crystal display (LCD) panel.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

In one or more embodiments, a display driver is disclosed. The display driver comprises image processing circuitry and driver circuitry. The image processing circuitry is configured to receive spatial distribution information of a physical quantity related to a display panel and generate output voltage data by processing input pixel data associated with respective subpixels of a pixel based on the spatial distribution information and a position of the pixel. The drive circuitry is configured to drive the display panel based on the output voltage data.

In one or more embodiments, a display system is disclosed. The display system comprises a display panel, a host, image processing circuitry, and drive circuitry. The host is configured to generate spatial distribution information of a physical quantity related to a display panel and input pixel data associated with a pixel. The image processing circuitry is configured to generate output voltage data by processing the input pixel data of subpixels of the pixel based on the spatial distribution information and a position of the pixel. The drive circuitry is configured to drive the display panel based on the output voltage data.

In one or more embodiments, a method is also disclosed. The method comprises receiving spatial distribution information of a physical quantity related to a display panel and generating output voltage data by processing input pixel data associated with subpixels of a pixel based on the spatial distribution information and a position of the pixel. The method further comprises driving the display panel based on the output voltage data.

BRIEF DESCRIPTION OF THE DRAWINGS

So that the manner in which the above recited features of the present disclosure may be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

FIG. 2 illustrates an example configuration of a pixel, according to one or more embodiments.

FIG. 3 illustrates an example configuration of a display driver, according to one or more embodiments.

FIG. 4 illustrates an example method for driving a display panel, according to one or more embodiments.

FIG. 8 illustrates an example correspondence between the Y coordinate of a pixel and blending ratios, according to one or more embodiments.

FIG. 22 illustrates an example configuration of a display panel, according to one or more embodiments.

FIG. 24 illustrates an example configuration of a display panel, according to one or more embodiments.

FIG. 26 illustrates an example configuration of a display panel, according to one or more embodiments.

Figure 1:
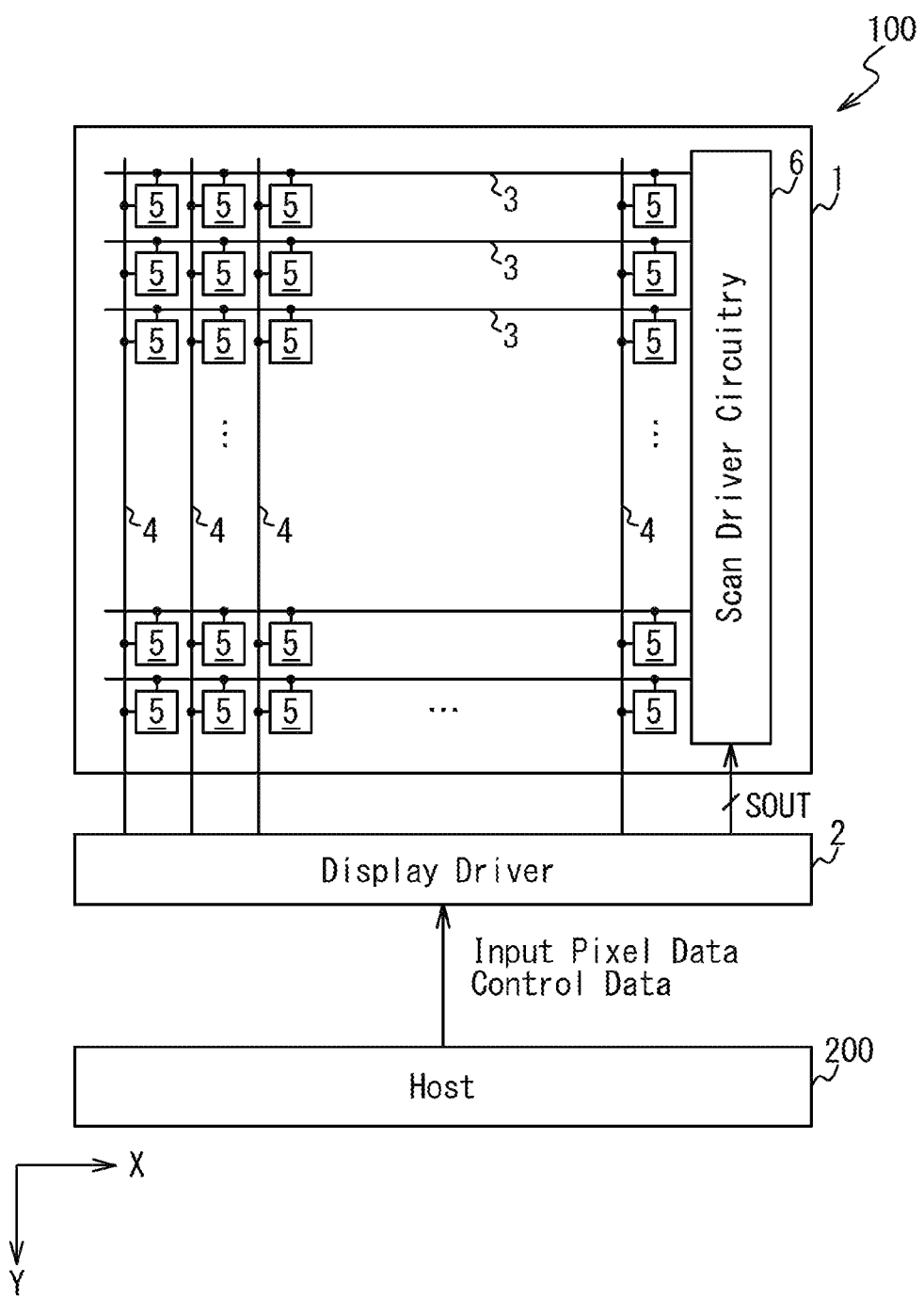
FIG. 1 illustrates an example configuration of a display module, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

A display panel may cause spatial distribution of a physical quantity related to the display panel due to its physical attribute and operating environment. The spatial distribution may cause location-dependent variations in the characteristics of the display panel and this may cause deviation of display colors from their design values. Various factors may cause the deviation of display colors and the amount of deviation may be location dependent in the display panel. For example, curvature of a display, viewing angles of a user, in-plane temperature of the display panel, ambient light, and so on can all cause such deviation. For a foldable display panel, for example, the curvature of the display panel may cause a spatial distribution of a physical quantity related to the display panel. This spatial distribution may cause location-dependent variations in the characteristics of the display panel which in turn can deteriorate the image quality. In this description, location-based color correction is introduced to correct or mitigate effects caused by this deviation.

FIG. 1 illustrates an example configuration of a display module 100, according to one or more embodiments. In the embodiment illustrated, a display module 100 comprises a display panel 1 and a display driver 2 configured to drive the display panel 1. The display panel 1 comprises scan lines 3, which may be also referred to as gate lines, data lines 4, which may be also referred to as source lines, subpixels 5, and scan driver circuitry 6. The scan lines 3 are connected to the scan driver circuitry 6 and the data lines 4 are connected to the display driver 2. The scan lines 3 are driven by the scan driver circuitry 6.

Each subpixel 5 is connected to the corresponding scan line 3 and data line 4. In embodiments where the display panel 1 comprises an OLED display panel, each subpixel 5 comprises a light emitting element, a select transistor and a hold capacitor. In embodiments where the display panel 1 comprises an LCD panel, each subpixel 5 comprises a pixel electrode, a select transistor, and a hold capacitor. The display panel 1 may comprise various interconnections other than the scan lines 3 and the data lines 4 depending on the configuration of the subpixels 5.

FIG. 2 illustrates an example configuration of a pixel 7 of the display panel 1, according to one or more embodiments. In the embodiment illustrated, each pixel 7 comprises a plurality of subpixels 5 configured to display different colors, e.g., red (R), green (G), or blue (B). The subpixels 5 configured to display red, green, and blue may be hereinafter referred to as R subpixel 5R, G subpixel 5G, and B subpixel 5B, respectively. In various embodiments, each pixel 7 comprises at least one R subpixel 5R, at least one G subpixel 5G, and at least one B subpixel 5B. The R subpixel 5R, the G subpixel 5G, and the B subpixel 5B of each pixel 7 may be connected to the same scan line 3. Each pixel 7 may comprises one or more additional subpixels configured to display a color other than red, green, and blue. The combination of the colors of the subpixels 5 of the pixels 7 is not limited to that disclosed herein. For example, each pixel 7 may further comprise a subpixel configured to display white or yellow. The display panel 1 may be configured to be adapted to subpixel rendering (SPR). In such embodiments, each pixel 7 may comprise a plurality of R subpixels 5R, a plurality of G subpixels 5G, and/or a plurality of B subpixels 5B.

Referring back to FIG. 1, an XY coordinate system may be defined for the display panel 1. In one or more embodiments, the X axis is defined in the horizontal direction of the display panel 1, that is, the direction parallel to the scan lines 3, and the Y axis is defined in the vertical direction of the display panel 1, that is, the direction parallel to the data lines 4. In such embodiments, the Y axis is orthogonal to the X axis. The position of each pixel 7 of the display panel 1 may be represented by coordinates (X, Y). The coordinate X may represent the position in the horizontal direction, and the coordinate Y may represent the position in the vertical direction.

In one or more embodiments, the display driver 2 is configured to receive input pixel data and control data from a host 200. The display driver 2 may be configured to supply drive voltages to subpixels 5 in each pixel 7 of the display panel 1 based on the input pixel data. In one or more embodiments, input pixel data associated with a pixel 7 describes a grayscale value for red, a grayscale value for green, and a grayscale value for blue. In the following, the grayscale value for red, the grayscale value for green, and the grayscale value for blue may be referred to as R grayscale value, G grayscale value, and B grayscale value, respectively. The voltage levels of drive voltages supplied to R, G, and B subpixels 5R, 5G, and 5B may be controlled by the R grayscale value, the G grayscale value, and the B grayscale value, respectively.

The operation of the display driver 2 may be controlled based on the control data received from the host 200. The display driver 2 may be configured to supply control signals SOUT to the scan driver circuitry 6 of the display panel 1 and thereby control the operation of the scan driver circuitry 6.

FIG. 3 illustrates an example configuration of the display driver 2, according to one or more embodiments. In the embodiment illustrated, the display driver 2 comprises interface circuitry (IF) 11, a display memory 12, image processing circuitry 13, driver circuitry 14, register circuitry 15. Optionally, the display driver 2 further comprises a non-volatile memory 16 connected to the register circuitry 15.

The interface circuitry 11 is configured to receive input pixel data from the host 200 and forward the received input pixel data to the display memory 12.

The display memory 12 is configured to temporarily store the input pixel data received from the host 200. The input pixel data may then be used by the image processing circuitry 13.

The image processing circuitry 13 is configured to generate output voltage data by processing the input pixel data received from the display memory 12. In various embodiments, the output voltage data associated with a pixel 7 may describe voltage values that specify drive voltages to be supplied to the R subpixel 5R, the G subpixel 5G, and the B subpixel 5B of the pixel 7. In the following, voltage values that specify drive voltages to be supplied to an R subpixel 5R, a G subpixel 5G, and a B subpixel 5B may be referred to as R voltage value, G voltage value, and B voltage value, respectively.

The drive circuitry 14 is configured to supply drive voltages to respective subpixels 5 of respective pixels 7 of the display panel 1 based on the output voltage data received from the image processing circuitry 13. The drive circuitry 14 may be configured to supply drive voltages corresponding to the voltage values described in the output voltage data to the respective subpixels 5 of the respective pixels 7.

The register circuitry 15 is configured to store a plurality of parameter sets used for the image processing in the image processing circuitry 13. The register circuitry 15 may be configured to supply the plurality of parameter sets to the image processing circuitry 13. Each of the plurality of parameter sets may comprise one or more parameters used for the image processing.

The non-volatile memory 16 is configured to store, in a non-volatile manner, the plurality of parameter sets to be stored in the register circuitry 15. In some embodiments, at startup of the display driver 2, the plurality of parameter sets received from the non-volatile memory 16 are forwarded and stored in the register circuitry 15.

In one or more embodiments, there is a spatial distribution of a physical quantity related to the display panel 1. This spatial distribution may cause an effect that may deteriorate the quality of an image displayed on the display panel 1 as described above. In various embodiments, to address the spatial distribution, the host 200 is configured to supply spatial distribution information to the display driver 2. The spatial distribution information may comprise information related to the spatial distribution of a physical quantity of the display panel 1. Examples of the physical quantity may include the curvature of the display panel 1, the angle between the line-of-sight direction and the nominal direction of the surface of the display panel 1, the temperature, the brightness level of ambient light, and the color temperature of the ambient light. The interface circuitry 11 is configured to receive the spatial distribution information from the host 200 and store it in the register circuitry 15. The spatial distribution information is forwarded to the image processing circuitry 13 and used to process the input pixel data.

In one or more embodiments, the image processing circuitry 13 is configured to generate output voltage data from input pixel data associated with a pixel 7 of interest by performing image processing for the respective colors of the subpixels 5 based on the position of the pixel 7 of interest and the spatial distribution information received from the register circuitry 15. Performing the image processing for the respective colors of the subpixels 5 may achieve a color correction. Such configuration may enable a color correction based on changes in the spatial distribution of a physical quantity of the display panel 1.

In the embodiment illustrated in FIG. 3, the image processing circuitry 13 is configured to individually generate blended parameter sets for the respective colors of the subpixels 5 by blending a plurality of parameter sets received from the register circuitry 15 based on the spatial distribution information and the position of the pixel 7 of interest and perform the image processing based on the blended parameter sets. In some embodiments, the image processing circuitry 13 is configured to generate the blended parameter sets by blending parameter sets #1 and #2 based on the spatial distribution information and the position of the pixel 7 of interest, where parameter set #1 is optimized for a first value of the physical quantity and parameter set #2 is optimized for a second value of the physical quantity. Such configuration enables generating blended parameter sets suitable for the spatial distribution of the physical quantity. In various embodiments, the first value is the maximum value of the physical quantity, and the second value is the minimum value of the physical quantity.

In one or more embodiments, the image processing circuitry 13 is configured to generate a blended parameter set for each of red, green, and blue. In the following, the blended parameter sets generated for red, green, and blue may be referred to as blended R parameter set, blended G parameter set, and blended B parameter set, respectively. In such embodiments, the image processing circuitry 13 may be configured to generate an R voltage value from an R grayscale value based on the blended R parameter set, generate a G voltage value from a G grayscale value based on the blended G parameter set, and generate a B voltage value from a B grayscale value based on the blended B parameter set.

In one or more embodiments, the image processing circuitry 13 comprises blending ratio generation circuitry 21, blending circuitry 22, and an image processing core 23. The blending ratio generation circuitry 21 is configured to generate a blending ratio for each of the red, green, and blue subpixels based on coordinates (X, Y) of the pixel 7 of interest and the spatial distribution information received from the register circuitry 15. The coordinates (X, Y) indicate the position of the pixel 7 of interest in the display panel 1. In the following, the blending ratios generated for red, green, and blue subpixels may be referred to as R blending ratio, G blending ratio, and B blending ratio, respectively. The blending circuitry 22 is configured to generate the blended R parameter set, the blended G parameter set, and the blended B parameter set by blending parameter sets #1 and #2 with the R blending ratio, the G blending ratio, and the B blending ratio, respectively. The image processing core 23 is configured to calculate R, G, and B voltage values of output voltage data from R, G, and B grayscale values of input pixel data by performing image processing based on the blended R, G, and B parameter sets, respectively. In various embodiments, the blended R parameter set may control the correspondence between the R grayscale value and the R voltage value, the blended G parameter set may control the correspondence between the G grayscale value and G voltage value, and the blended B parameter set may control the correspondence between the B grayscale value and the B voltage value. In one or more embodiments, color correction is performed by the image processing core 23 by, for example, individually controlling the grayscale values (thus the corresponding voltage values) for the respective colors of the subpixels.

The blending circuitry 22 may be configured to calculate parameters of the blended R, G, and B parameter sets as weighted sums of corresponding parameters of parameter sets #1 and #2. In such embodiments, the weights of the weighted sums may be determined based on the R, G, and B blending ratios.

For example, the blending circuitry 22 may generate the blended R, G, and B parameter sets by applying alpha blending to parameter sets #1 and #2. In one or more embodiments, parameter set #1 comprises n parameters $x_{11}$, $x_{12}$ ... and $x_{1n}$, and parameter set #2 comprises n corresponding parameters $x_{21}$, $x_{22}$ ... and $x_{2n}$, while the R, G, and B blending ratios $\alpha_R$, $\alpha_G$, and $\alpha_B$ range from zero to one.

In such embodiments, the blended R, G, and B parameter sets may be calculated in accordance with the following equations (1-1) to (1-3):

$$x_{Ri}=\alpha_R \cdot x_{1i}+(1-\alpha_R) \cdot x_{2i}, \quad (1\text{-}1)$$

$$x_{Gi}=\alpha_G \cdot x_{1i}+(1-\alpha_G) \cdot x_{2i}, \text{ and} \quad (1\text{-}2)$$

$$x_{Bi}=\alpha_B \cdot x_{1i}+(1-\alpha_B) \cdot x_{2i}, \quad (1\text{-}3)$$

where i is any integer from one to n, $x_{Ri}$ is a parameter of the blended R parameter set which corresponds to the parameters $x_{1i}$ and $x_{2i}$, $x_{Gi}$ is a parameter of the blended G parameter set which corresponds to the parameters $x_{1i}$ and $x_{2i}$, and $x_{Bi}$ is a parameter of the blended B parameter set which corresponds to the parameters $x_{1i}$ and $x_{2i}$. In embodiments where equations (1-1) to (1-3) hold, the blended R parameter set is the same as parameter set #1 when $\alpha_R$ is one, and the blended R parameter set is the same as parameter set #2 when $\alpha_R$ is zero. In such embodiments, the same goes for $\alpha_G$ and $\alpha_B$.

The spatial distribution information supplied to the blending ratio generation circuitry 21 may comprise information that enables determining the spatial distribution of a physical quantity related to the display panel 1. In other embodiments, the spatial distribution information may comprise information based on the spatial distribution of the physical quantity. In some embodiments, the spatial distribution information may comprise information generated based on the spatial distribution of the physical quantity to indicate a correspondence between the R, G, and B blending ratios and the position of the pixel 7 of interest in the display panel 1. The blending ratio generation circuitry 21 may comprise a lookup table that describes R, G, and B blending ratios for respective positions of the pixel 7 of interest in the display panel 1. In such embodiments, the spatial distribution information may comprise table values of the lookup table.

Method 400 of FIG. 4 illustrates steps for driving the display panel 1 in one or more embodiments. At step 410, the display driver 2 receives spatial distribution information of a physical quantity related to the display panel 1 in one or more embodiments. At step 420, the image processing circuitry 13 performs image processing on input pixel data associated with a pixel of interest for respective colors of subpixels 5 to generate output voltage data, in one or more embodiments. The pixel of interest may be a pixel currently under the image processing. In various embodiments, the image processing is based on the spatial distribution information and the position of the pixel of interest. At step 430, the driver circuitry 14 drives the display panel 1 based on the output voltage data, in one or more embodiments.

Figure 5A:
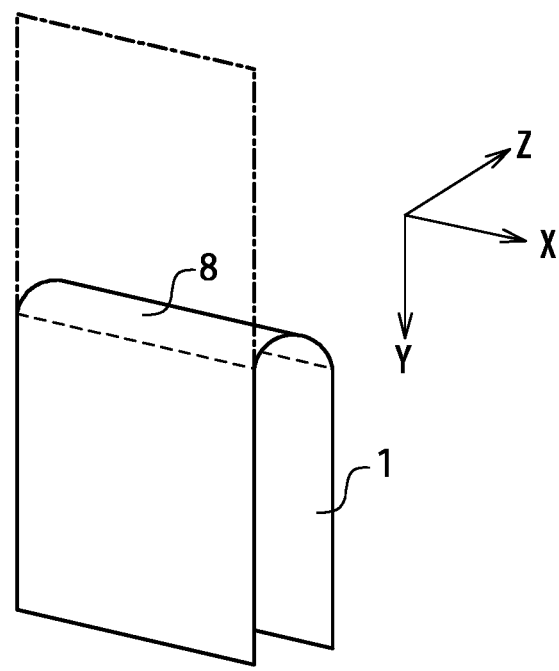
FIGS. 5A and 5B illustrate a foldable display panel, according to one or more embodiments.
Figure 5B:
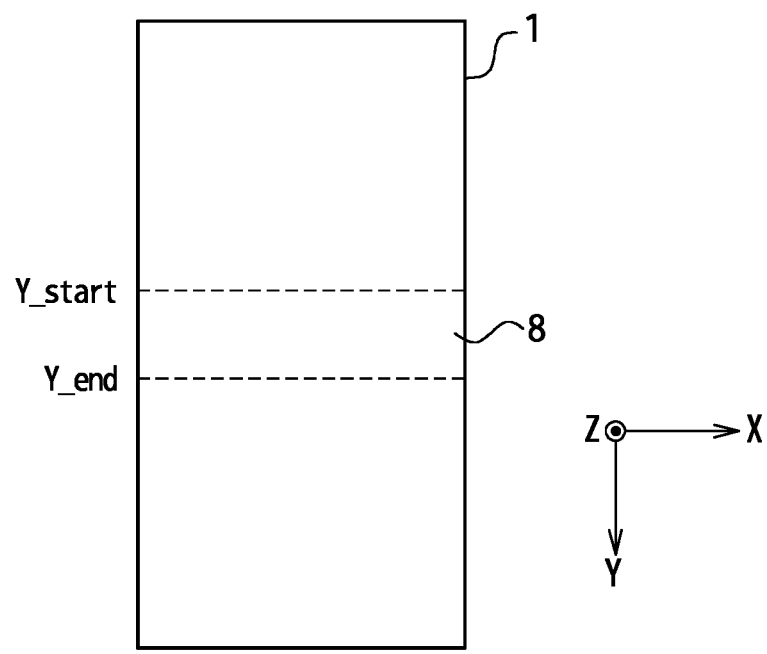

FIGS. 5A and 5B illustrate an example configuration of the display panel 1, according to one or more embodiments. In the embodiment illustrated, the display panel 1 is configured to be foldable. The solid line of FIG. 5A indicates a state in which the display panel 1 is folded, and the broken line indicates a state in which the display panel 1 is unfolded. The display panel 1 may be configured to be foldable between a folded position and an unfolded position. In one or more embodiments, the display panel 1 is configured to be foldable at a foldable area 8. In various embodiments, as illustrated in FIG. 5B, the foldable area 8 may cross the display panel 1 in the horizontal direction. In FIG. 5B, "Y_start" indicates the Y coordinate of pixels 7 positioned at the upper end of the foldable area 8, and "Y_end" indicates the Y coordinate of pixels 7 positioned at the lower end of the foldable area 8.

In one or more embodiments, the image processing performed by the image processing circuitry 13 comprises color correction for pixels 7 positioned in the foldable area 8 of the display panel 1. The display panel 1 may be bent at the foldable area 8, and therefore the angle between the nominal direction of the surface of the display panel 1 and the line-of-sight direction of a user observing the display panel 1 may vary depending on the position in the display panel 1. In one or more embodiments, the image processing circuitry 13 is configured to perform the image processing to improve the image quality through reduction in a color shift that potentially results from variations in the angle between the nominal direction of the surface of the display panel 1 and the line-of-sight direction of the user.

The spatial distribution information may comprise folding information generated based on whether the display panel 1 is folded, and the blending ratio generation circuitry 21 may be configured to generate the R, G, and B blending ratios based on the folding information and the coordinates (X, Y) of the pixel 7 of interest. In various embodiments, the spatial distribution of the curvature of the display panel 1 in the foldable area 8 can be determined based on the folding information. In one example, when the folding information indicates that the display panel 1 is unfolded and flat, the curvature in the foldable area 8 can be determined as zero. In another example, when the folding information indicates that the display panel 1 is folded, the curvature of each position in the foldable area 8 can be determined as a specific value that depends on the physical structure. The folding information may indicate the degree of folding, such as the angle formed between two flat portions of the display panel 1 separated by the foldable area 8.

In one or more embodiments, parameter set #1 may correspond to a first curvature, and parameter set #2 may correspond to a second curvature different from the first curvature. The first curvature may be zero, and the second curvature may be the maximum curvature of the foldable area 8 when the display panel 1 is folded. In one or more embodiments, blended R, G, and B parameter sets suitable for the spatial distribution of the curvature in the foldable area 8 are generated by blending parameter sets #1 and #2 based on R, G, and B blending ratios generated based on the folding information and the coordinates (X, Y) of the pixel 7 of interest.

Figure 6:
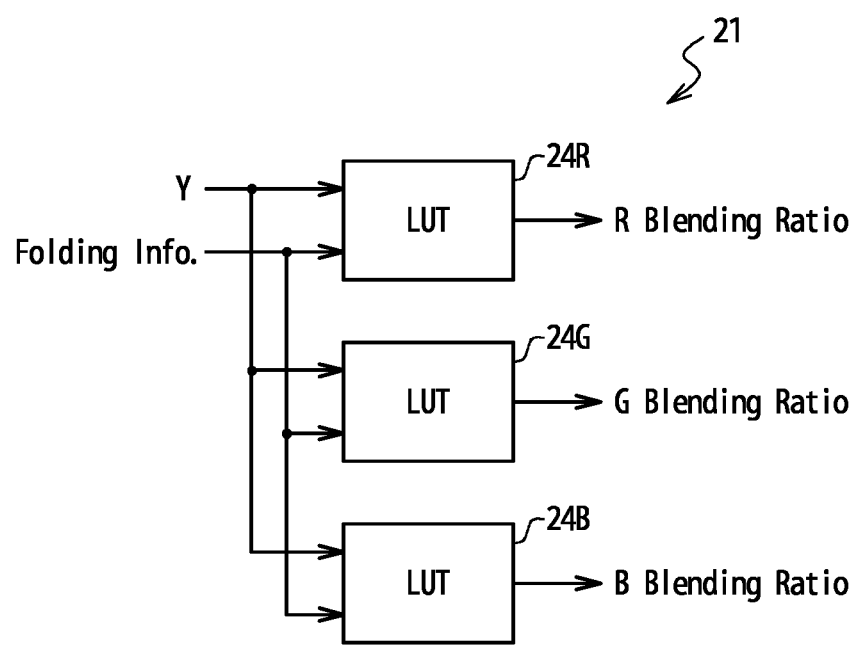
FIG. 6 illustrates an example configuration of blending ratio generation circuitry, according to one or more embodiments.
Figure 7:
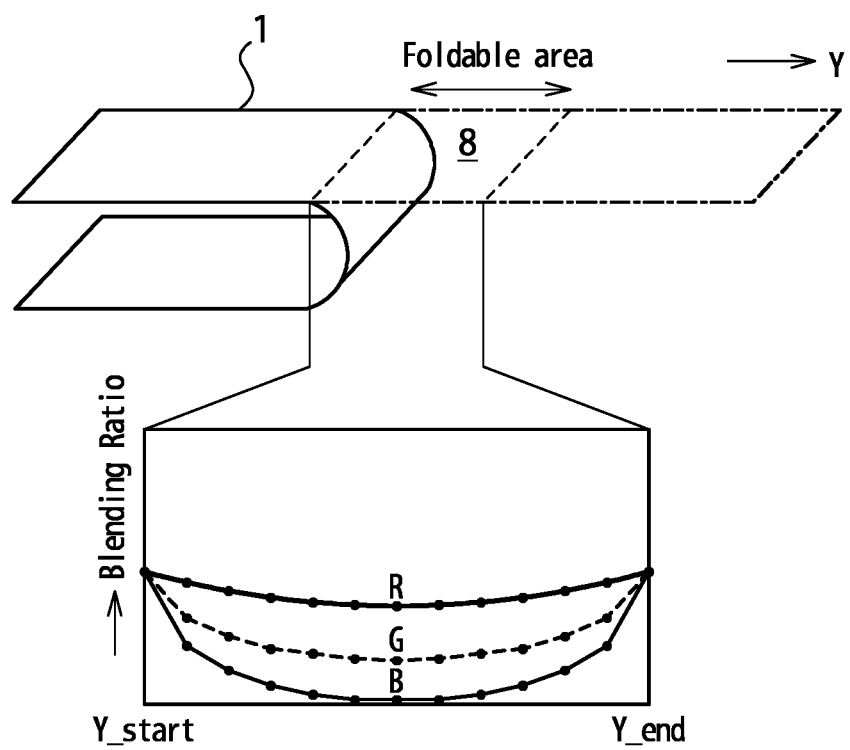
FIG. 7 illustrates an example correspondence between the Y coordinate of a pixel and blending ratios, according to one or more embodiments.

FIG. 6 illustrates an example configuration of the blending ratio generation circuitry 21, according to one or more embodiments. In the embodiment illustrated, the blending ratio generation circuitry 21 comprises lookup tables (LUT) 24R, 24G, and 24B used for generating the R, G, and B blending ratios, respectively. FIG. 7 illustrates example contents of the LUTs 24R, 24G, and 24B. The dots in the graph of FIG. 7 indicate the contents of the LUTs 24R, 24G, and 24B. The LUTs 24R, 24G, and 24B may respectively describe correspondences between the R, G, and B blending ratios and the Y coordinate in the foldable area 8. The blending ratio generation circuitry 21 may be configured to generate the R, G, and B blending ratios through table lookups on the LUT 24R, 24G and 24B with reference to the folding information and the Y coordinate of the pixel 7 of interest. The blending ratio generation circuitry 21 may be configured to implement a linear interpolation with respect to the Y coordinate to generate the R, G, and B blending ratios.

Figure 9:
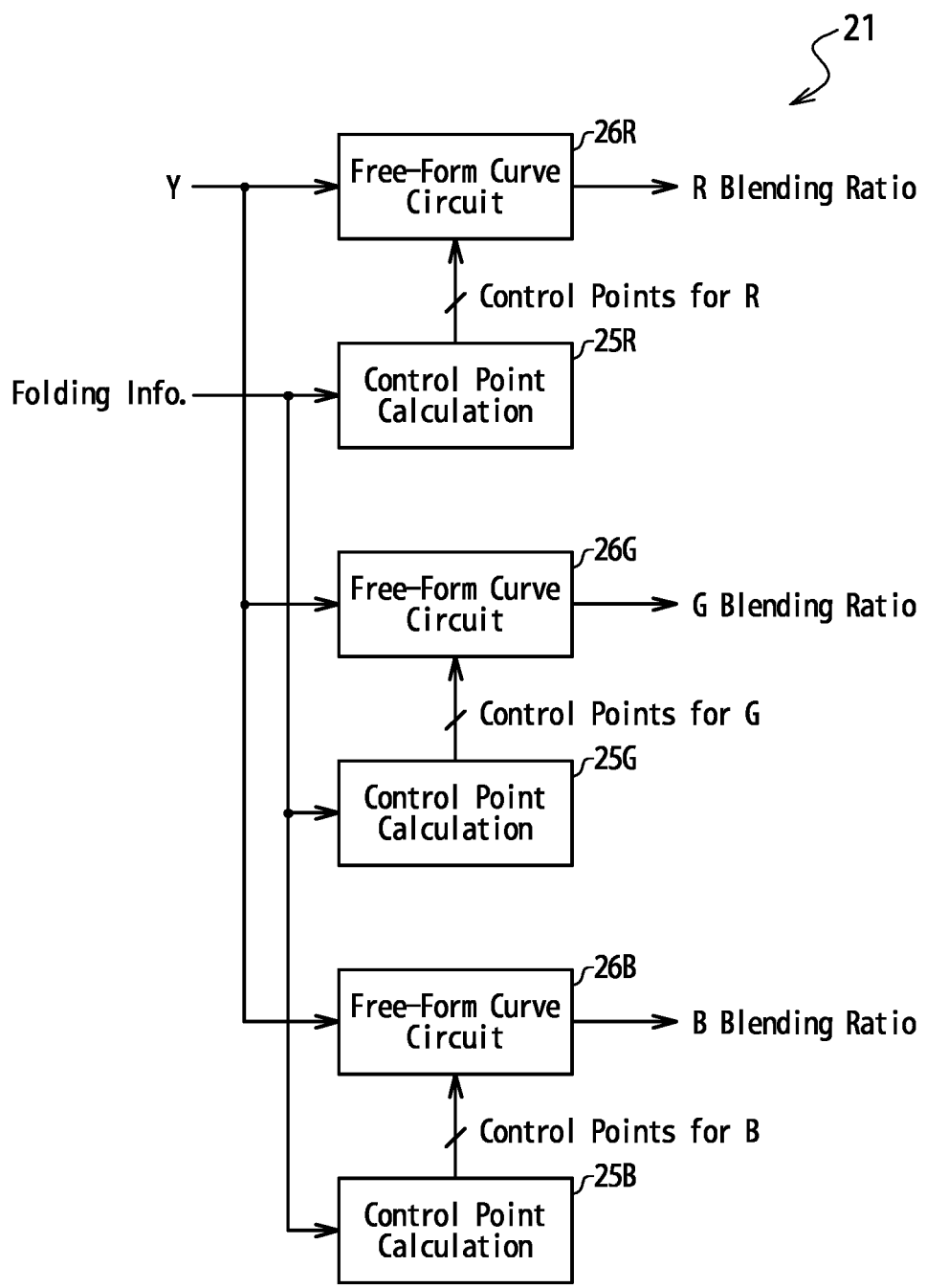
FIG. 9 illustrates an example configuration of blending ratio generation circuitry, according to one or more embodiments.

In one or more embodiments, as illustrated in FIG. 8, the correspondences between the R, G, and B blending ratios and the Y coordinate in the foldable area 8 may be represented by free-form curves, such as Bezier curves. Use of free-form curves is an alternative embodiment to using LUTs, which may reduce the circuit size of the image processing circuitry 13. FIG. 9 illustrates an example configuration of the blending ratio generation circuitry 21 in such embodiments, in which the blending ratio generation circuitry 21 is configured differently from that illustrated in FIG. 8. In the embodiment illustrated in FIG. 9, the blending ratio generation circuitry 21 comprises control point calculation circuits 25R, 25G, and 25B and free-form curve circuits 26R, 26G, and 26B.

In one or more embodiments, the control point calculation circuit 25R is configured to calculate, based on the folding information, control points that specify a free-form curve representing the correspondence between the R blending ratio and the Y coordinate in the foldable area 8. In such embodiments, the free-form curve circuit 26R may be configured to generate the R blending ratio based on the Y coordinate of the pixel 7 of interest and the free-form curve specified by the control points calculated by the control point calculation circuit 25R. The calculation of the control points based on the folding information may enable specifying a free-form curve in accordance to changes in the spatial distribution of the curvature of the display panel 1 and properly calculating the R blending ratio.

In one or more embodiments, the control point calculation circuits 25G and 25B are configured similarly to the control point calculation circuit 25R, and the free-form curve circuits 26G and 26B are configured similarly to the free-form curve circuit 26R. The control point calculation circuit 25G may be configured to calculate, based on the folding information, control points that specify a free-form curve representing the correspondence between the G blending ratio and the Y coordinate in the foldable area 8. The free-form curve circuit 26G may be configured to generate the G blending ratio based on the Y coordinate of the pixel 7 of interest and the free-form curve specified by the control points calculated by the control point calculation circuit 25G. The control point calculation circuit 25B may be configured to calculate, based on the folding information, control points that specify a free-form curve representing the correspondence between the B blending ratio and the Y coordinate in the foldable area 8. The free-form curve circuit 26B may be configured to generate the B blending ratio based on the Y coordinate of the pixel 7 of interest and the free-form curve specified by the control points calculated by the control point calculation circuit 25B.

Figure 10:
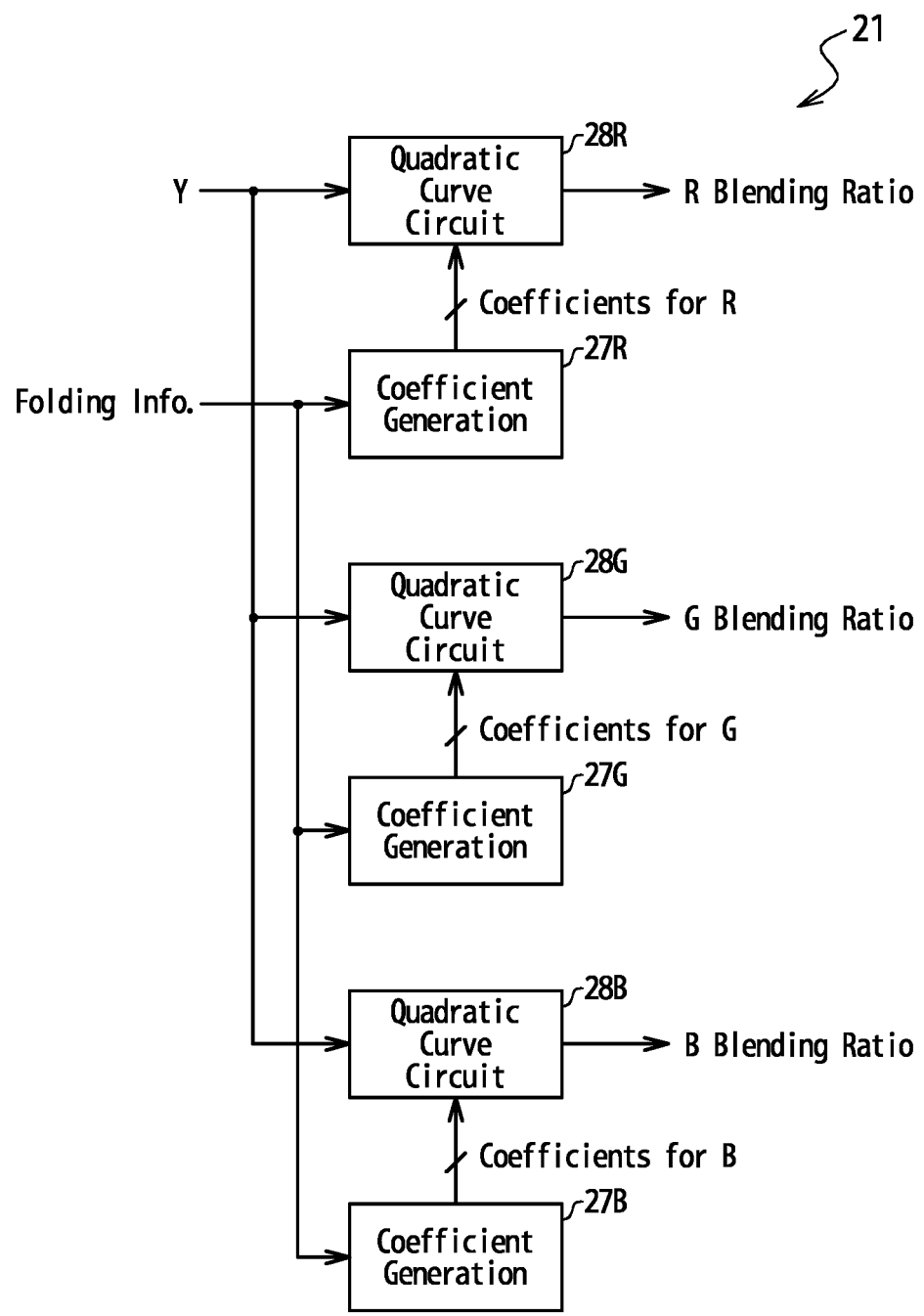
FIG. 10 illustrates an example configuration of blending ratio generation circuitry, according to one or more embodiments.

The correspondence between the R, G, and B blending ratios and the Y coordinate in the foldable area 8 may be represented as a part of a quadratic curve. The quadratic curve may comprise a circle, an ellipse, a parabola, a hyperbolic curve or a curve represented by a quadratic function. FIG. 10 illustrates an example configuration of the blending ratio generation circuitry 21 in such embodiments. In the embodiment illustrated in FIG. 10, the blending ratio generation circuitry 21 comprises coefficient calculation circuits 27R, 27G, and 27B and quadratic curve circuits 28R, 28G, and 28B.

In one or more embodiments, the coefficient calculation circuit 27R is configured to calculate, based on the folding information, coefficients that specify a quadratic curve representing the correspondence between the R blending ratio and the Y coordinate in the foldable area 8. In such embodiments, the quadratic curve circuit 28R may be configured to generate the R blending ratio based on the Y coordinate of the pixel 7 of interest and the quadratic curve specified by the coefficients calculated by the coefficient calculation circuit 27R. The calculation of the coefficients of the quadratic curve based on the folding information may enable specifying the quadratic curve in accordance to changes in the spatial distribution of the curvature of the display panel 1 and properly calculating the R blending ratio.

In one or more embodiments, the coefficient calculation circuits 27G and 27B are configured similarly to the coefficient calculation circuit 27R, and the quadratic curve circuits 28G and 28B are configured similarly to the quadratic curve circuit 28R. The coefficient calculation circuit 27G may be configured to calculate, based on the folding information, coefficients that specify a quadratic curve representing the correspondence between the G blending ratio and the Y coordinate in the foldable area 8. The quadratic curve circuit 28G may be configured to generate the G blending ratio based on the Y coordinate of the pixel 7 of interest and the quadratic curve specified by the coefficients calculated by the coefficient calculation circuit 27G. The coefficient calculation circuit 27B may be configured to calculate, based on the folding information, coefficients that specify a quadratic curve representing the correspondence between the B blending ratio and the Y coordinate in the foldable area 8. The quadratic curve circuit 28B may be configured to generate the B blending ratio based on the Y coordinate of the pixel 7 of interest and the quadratic curve specified by the coefficients calculated by the coefficient calculation circuit 27B.

Figure 11:
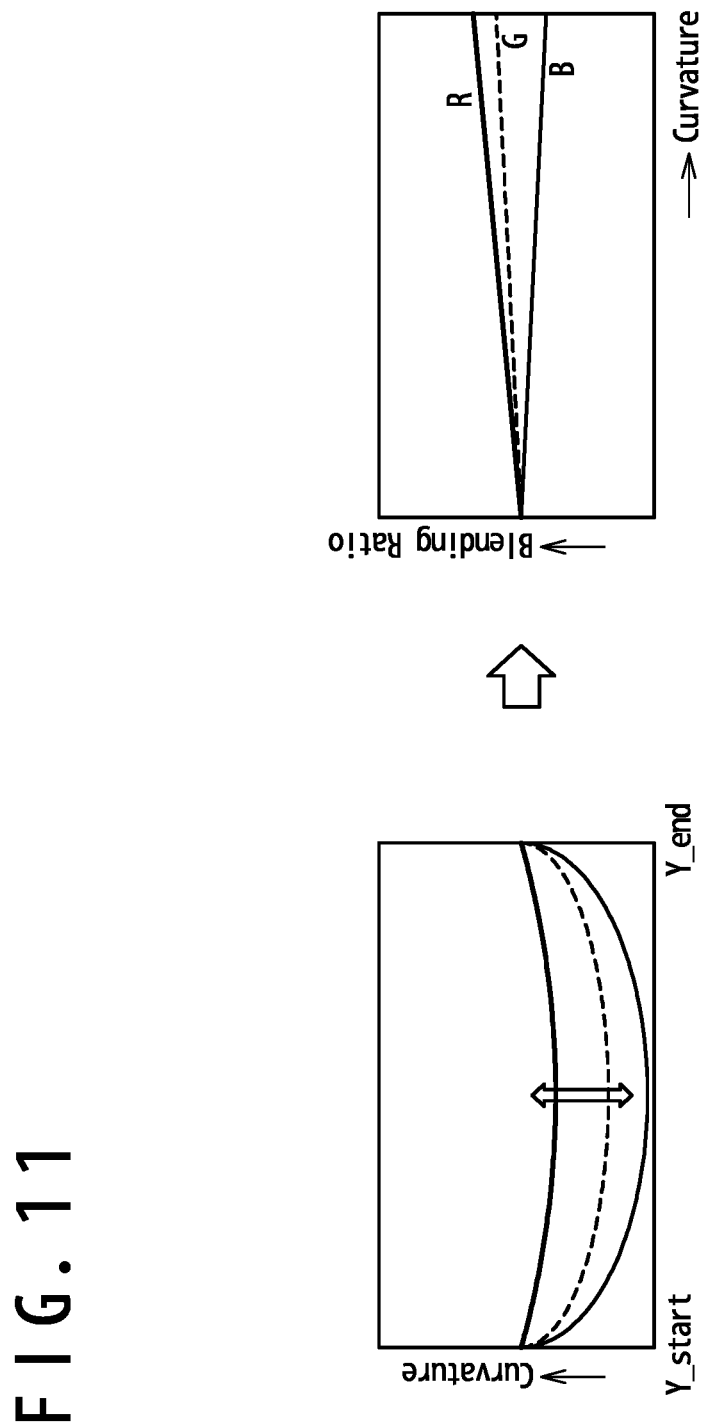
FIG. 11 illustrates an example operation of blending ratio generation circuitry, according to one or more embodiments.

FIG. 11 illustrates an example operation of the blending ratio generation circuitry 21 in other embodiments. The blending ratio generation circuitry 21 may be configured to calculate the curvature at the position of the pixel 7 of interest based on the folding information and calculate the R, G, and B blending ratios based on the calculated curvature.

Figure 12:
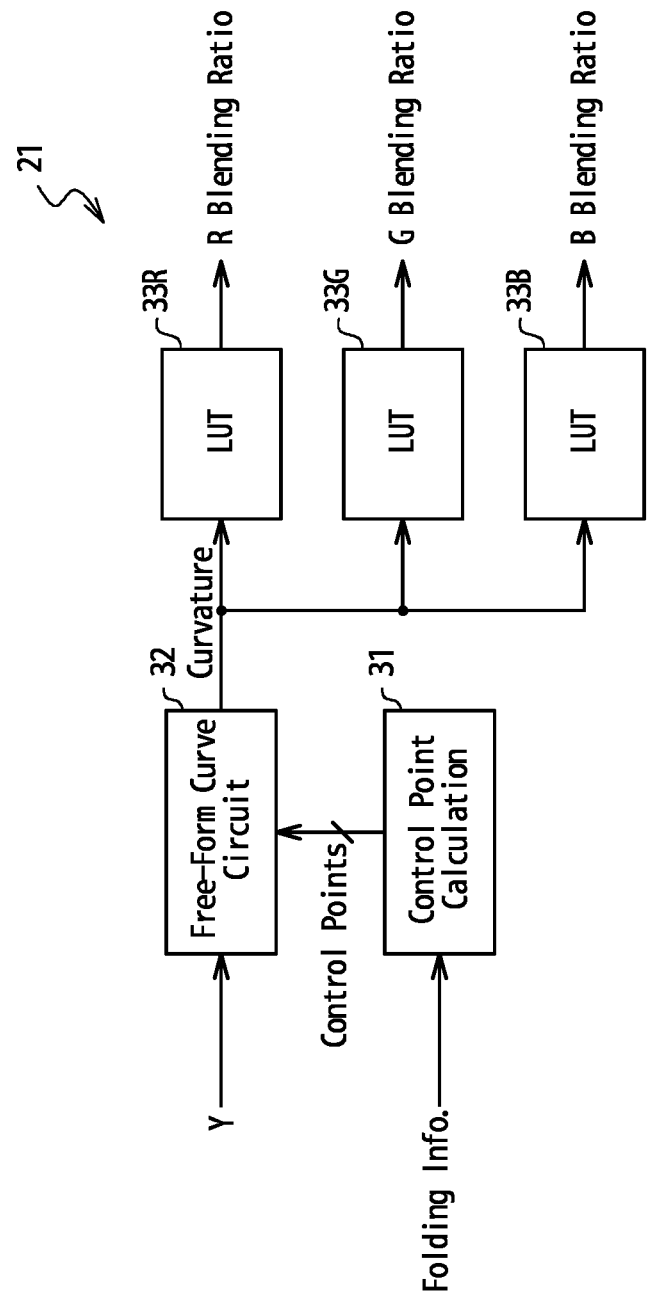
FIG. 12 illustrates an example configuration of blending ratio generation circuitry, according to one or more embodiments.

In one or more embodiments, the correspondence between the curvature and the Y coordinate in the foldable area 8 is represented by a free-form curve, such as a Bezier curve. FIG. 12 illustrates an example configuration of the blending ratio generation circuitry 21 in such embodiments. In the embodiment illustrated in FIG. 12, the blending ratio generation circuitry 21 comprises a control point calculation circuit 31, a free-form curve circuit 32, and LUTs 33R, 33G, and 33B. The control point calculation circuit 31 is configured to calculate, based on the folding information, control points that specify a free-form curve representing the correspondence between the curvature and the Y coordinate in the foldable area 8. The free-form curve may be a Bezier curve. The free-form curve circuit 32 is configured to calculate the curvature at the position of the pixel 7 of interest based on the Y coordinate of the pixel 7 of interest and the free-form curve specified by the control points calculated by the control point calculation circuit 31. The LUTs 33R, 33G, and 33B respectively describe the correspondences between the R, G, and B blending ratios and the curvature. The blending ratio generation circuitry 21 may be configured to generate the R, G, and B blending ratios through table lookups on the LUTs 33R, 33G, and 33B, respectively, with reference to the calculated curvature. The blending ratio generation circuitry 21 may be configured to implement a linear interpolation based on the curvature to generate the R, G, and B blending ratios.

Figure 13:
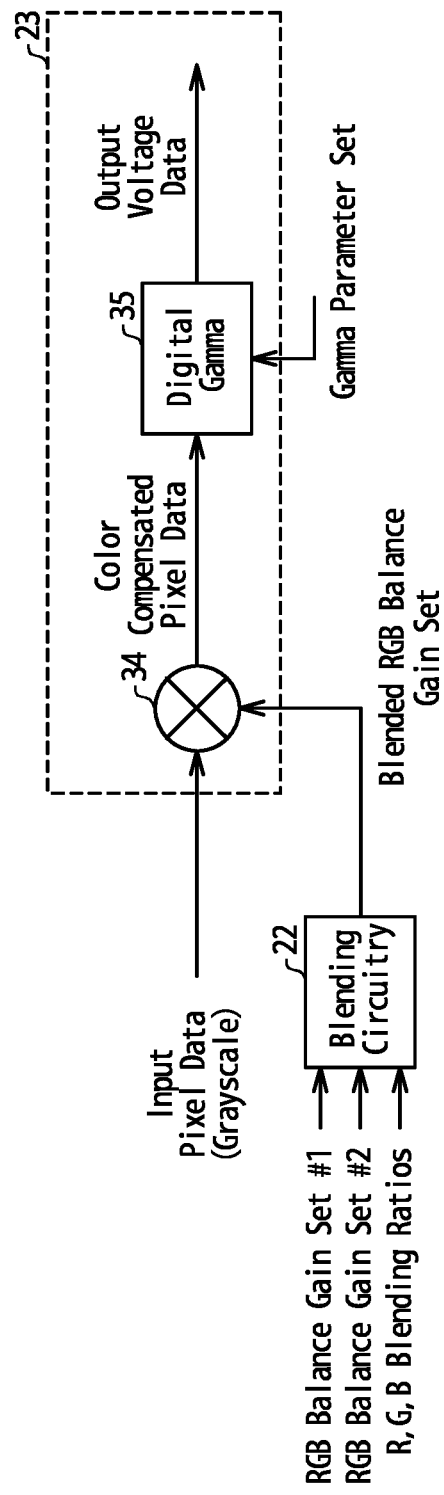
FIG. 13 illustrates an example configuration of an image processing core, according to one or more embodiments.

FIG. 13 illustrates an example configuration of the image processing core 23, according to one or more embodiments. In the embodiment illustrated in FIG. 13, the image processing core 23 is configured to generate color-compensated pixel data by correcting the input pixel data based on a blended parameter set and calculate the output voltage data by performing digital gamma processing on the color-compensated pixel data. Such configuration may achieve color correction in accordance with the spatial distribution of the curvature in the foldable area 8.

In one or more embodiments, parameter sets #1 and #2 supplied to the blending circuitry 22 comprise RGB balance gain sets #1 and #2, respectively. Each of RGB balance gain sets #1 and #2 may comprise R, G, and B gains by which the R, G and B grayscale values of the input pixel data are to be multiplied, respectively. In one or more embodiments, the blending circuitry 22 is configured to generate a blended RGB balance gain set by blending RGB balance gain sets #1 and #2 based on the R, G, and B blending ratios. The blending circuitry 22 may be configured to generate the R gain of the blended RGB balance gain set by blending the R gains of RGB balance gain sets #1 and #2 based on the R blending ratio. The blending circuitry 22 may be further configured to generate the G gain of the blended RGB balance gain set by blending the G gains of RGB balance gain sets #1 and #2 based on the G blending ratio. The blending circuitry 22 may be further configured to generate the B gain of the blended RGB balance gain set by blending the B gains of RGB balance gain sets #1 and #2 based on the B blending ratio.

In one or more embodiments, the image processing core 23 comprises a multiplier 34 and digital gamma circuitry 35. The multiplier 34 may be configured to calculate the R, G, and B grayscale values of the color-compensated pixel data by multiplying the R, G, and B grayscale values of the input pixel data by the R, G, and B gains of the blended RGB balance gain set, respectively. The digital gamma circuitry 35 may be configured to generate the output voltage data by performing digital gamma processing on the color-compensated pixel data. In various embodiments, a gamma parameter set that comprises at least one gamma parameter is supplied to the digital gamma circuitry 35 to control the input-output characteristics of the digital gamma processing. In such embodiments, the correspondences between the R, G, and B grayscale values of the color-compensated pixel data and the R, G, and B voltage values of the output voltage data may be controlled by the gamma parameter set.

Figure 14:
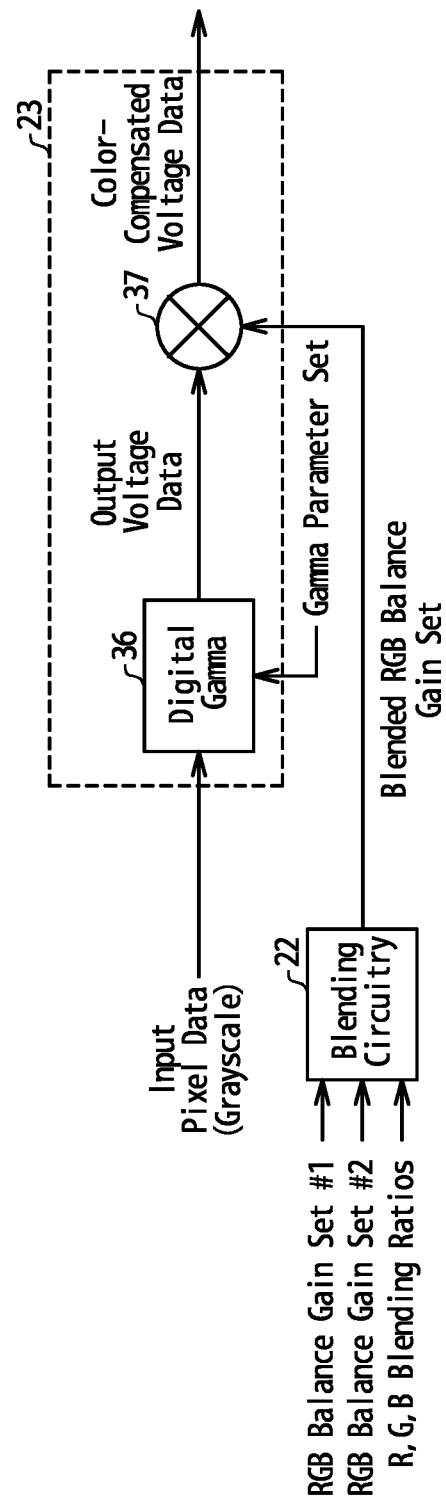
FIG. 14 illustrates an example configuration of an image processing core, according to one or more embodiments.

FIG. 14 illustrates an example configuration of the image processing core 23, according to other embodiments, in which the processing core 23 is configured different from that illustrated in FIG. 13. In the embodiment illustrated in FIG. 14, the image processing core 23 is configured to generate the output voltage data by performing digital gamma processing on the input pixel data and generate a color-compensated voltage data by correcting the output voltage data based on a blended parameter set. In such embodiments, the drive circuitry 14 may be configured to supply drive voltages to the respective subpixels 5 of the respective pixels 7 of the display panel 1 based on the color-compensated voltage data. The drive circuitry 14 may be configured to supply drive voltages corresponding to voltage values described in the color-compensated voltage to the respective subpixels 5 of the respective pixels 7. Such configuration may achieve a color correction in accordance with the spatial distribution of the curvature in the foldable area 8.

In one or more embodiments, parameter sets #1 and #2 supplied to the blending circuitry 22 comprise RGB balance gain sets #1 and #2, respectively. Each of RGB balance gain sets #1 and #2 may comprise R, G, and B gains by which the R, G and B voltage values of the output voltage data are to be multiplied, respectively. In one or more embodiments, the blending circuitry 22 is configured to generate a blended RGB balance gain set by blending RGB balance gain sets #1 and #2 based on the R, G, and B blending ratios. The blending circuitry 22 may be configured to generate the R gain of the blended RGB balance gain set by blending the R gains of RGB balance gain sets #1 and #2 based on the R blending ratio. The blending circuitry 22 may be further configured to generate the G gain of the blended RGB balance gain set by blending the G gains of RGB balance gain sets #1 and #2 based on the G blending ratio. The blending circuitry 22 may be further configured to generate the B gain of the blended RGB balance gain set by blending the B gains of RGB balance gain sets #1 and #2 based on the B blending ratio.

In the embodiment illustrated in FIG. 14, the image processing core 23 comprises digital gamma circuitry 36 and a multiplier 37. The digital gamma circuitry 36 may be configured to generate the output voltage data by performing digital gamma processing on the input pixel data. The multiplier 37 may be configured to calculate the R, G, and B voltage values of the color-compensated voltage data by multiplying the R, G, and B voltage values of the output voltage data by the R, G, and B gains of the blended RGB balance gain set, respectively.

Figure 15:
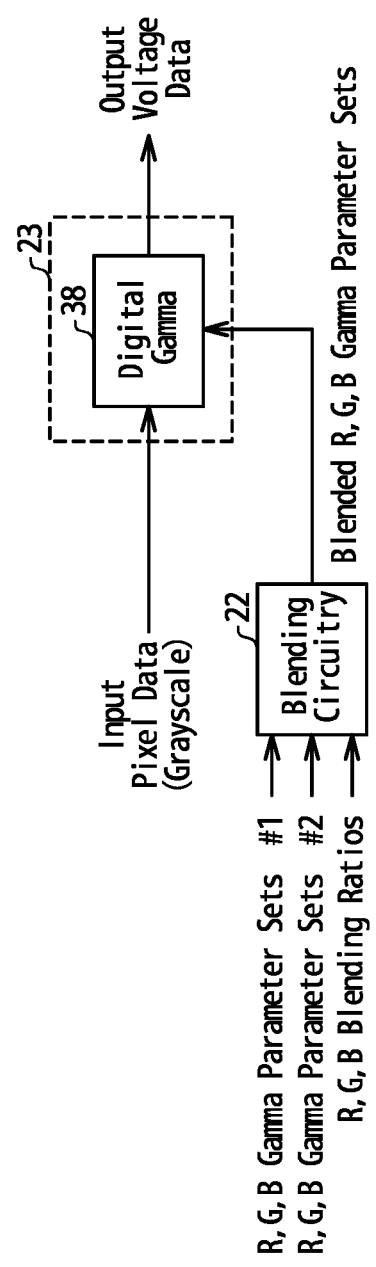
FIG. 15 illustrates an example configuration of an image processing core, according to one or more embodiments.

FIG. 15 illustrates an example configuration of the image processing core 23 in still other embodiments, in which the image processing core 23 is configured differently from those illustrated in FIGS. 13 and 14. In the embodiment illustrated, parameter set #1 supplied to the blending circuitry 22 comprises R, G, and B gamma parameter sets #1, and parameter set #2 supplied to the blending circuitry 22 comprises R, G, and B gamma parameter sets #2. R gamma parameter sets #1 and #2 may each represent a correspondence between the R grayscale value of the input pixel data and the R voltage value of the output voltage data. Further, G gamma parameter sets #1 and #2 may each represent a correspondence between the G grayscale value and the G voltage value, and B gamma parameter sets #1 and #2 may each represent a correspondence between the B grayscale value and the B voltage value.

In one or more embodiments, the blending circuitry 22 is configured to generate blended R, G, and B gamma parameter sets by blending R, G, and B gamma parameter sets #1 and #2 based on the R, G, and B blending ratios, respectively. The blending circuitry 22 may be configured to generate the blended R gamma parameter set by blending R gamma parameter sets #1 and #2 based on the R blending ratio. The blending circuitry 22 may be further configured to generate the blended G gamma parameter set by blending G gamma parameter sets #1 and #2 based on the G blending ratio. The blending circuitry 22 may be further configured to generate the blended B gamma parameter set by blending B gamma parameter sets #1 and #2 based on the B blending ratio.

In one or more embodiments, the image processing core 23 may comprise digital gamma circuitry 38 configured to generate the output voltage data by performing digital gamma processing on the input pixel data based on the blended R, G, and B gamma parameter sets. The digital gamma circuitry 38 may be configured to generate the R voltage value of the output voltage data from the R grayscale value of the input pixel data by performing the digital gamma processing based on the blended R gamma parameter set. The digital gamma circuitry 38 may be further configured to generate the G voltage value of the output voltage data from the G grayscale value of the input pixel data by performing the digital gamma processing based on the blended G gamma parameter set. The digital gamma circuitry 38 may be further configured to generate the B voltage value of the output voltage data from the B grayscale value of the input pixel data by performing the digital gamma processing based on the blended B gamma parameter set. Such configuration may achieve a color correction in accordance with the spatial distribution of the curvature in the foldable area 8.

Figure 16:
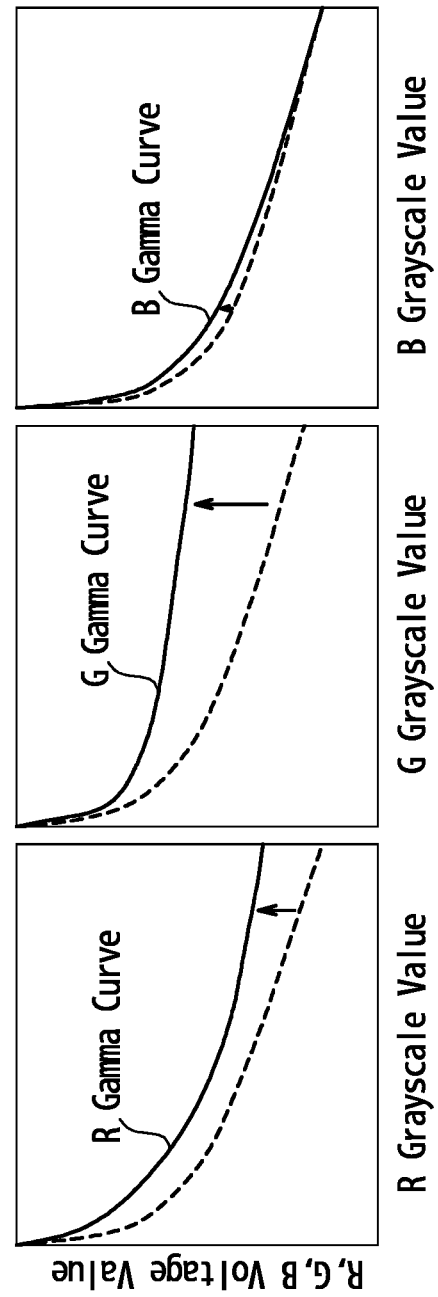
FIG. 16 illustrates an example operation of digital gamma circuitry, according to one or more embodiments.
Figure 17:
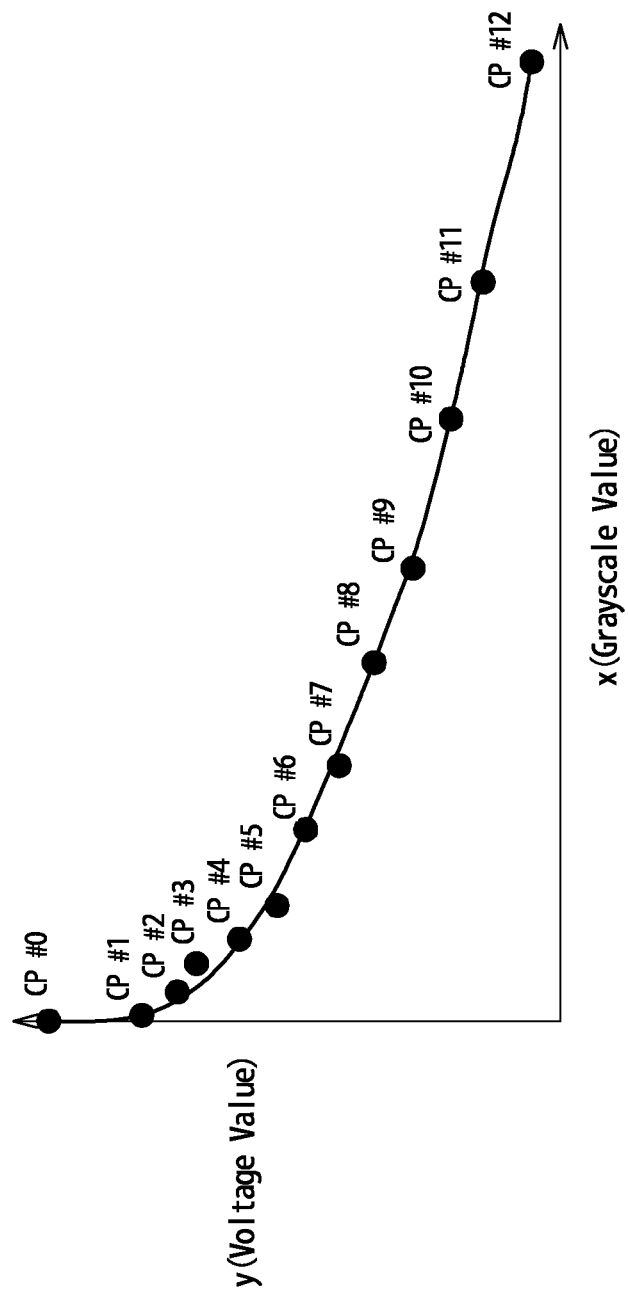
FIG. 17 illustrates an example relationship between control points and a gamma curve.

FIG. 16 illustrates an example operation of digital gamma circuitry 38, according to one or more embodiments. In various embodiments, the R gamma parameter set represents the correspondence between the R grayscale value of the input pixel data and the R voltage value of the output voltage data in the form of an R gamma curve; the G gamma parameter set represents the correspondence between the G grayscale value and the G voltage value in the form of a G gamma curve; and the B gamma parameter set represents the correspondence between the B grayscale value and the B voltage value in the form of a B gamma curve. FIG. 17 illustrates an example relationship between control points and a gamma curve, in one or more embodiments. Each of the R, G and B gamma curves may comprise a free-form curve specified by a plurality of control points CP #0 to CP #m. In the example illustrated in FIG. 17, m=12. However, in other embodiments, m may be greater than or less than 12. In some embodiments, each of the R, G and B gamma curves comprises a Bezier curve specified by a plurality of control points CP #0 to CP #m.

In various embodiments, each of the R, G, and B gamma parameter sets describes positions or coordinates of the control points CP #0 to CP #m in a coordinate system. The coordinate system may be defined with a first coordinate axis that represents the grayscale value and a second coordinate axis that represents the voltage value. In FIG. 17, the first coordinate axis is illustrated as the horizontal axis, that is, the x axis, and the second coordinate axis is illustrated as the vertical axis, that is, the y axis.

In one or more embodiments, as illustrated in FIG. 16, the positions of the control points CP #0 to CP #m of the blended R gamma parameter set are adjusted based on the R blending ratio to control the R gamma curve that represents the correspondence between the R grayscale value of the input pixel data and the R voltage value of the output voltage value. In one or more embodiments, the positions of the control points CP #0 to CP #m of the blended G gamma parameter set are adjusted based on the G blending ratio to control the G gamma curve that represents the correspondence between the G grayscale value of the input pixel data and the G voltage value of the output voltage value. In one or more embodiments, the positions of the control points CP #0 to CP #m of the blended B gamma parameter set are adjusted based on the B blending ratio to control the B gamma curve that represents the correspondence between the B grayscale value of the input pixel data and the B voltage value of the output voltage value. In various embodiments, a color correction in accordance with the spatial distribution of the curvature in the foldable area 8 is achieved by individually controlling the R, G, and B gamma curves.

Figure 18:
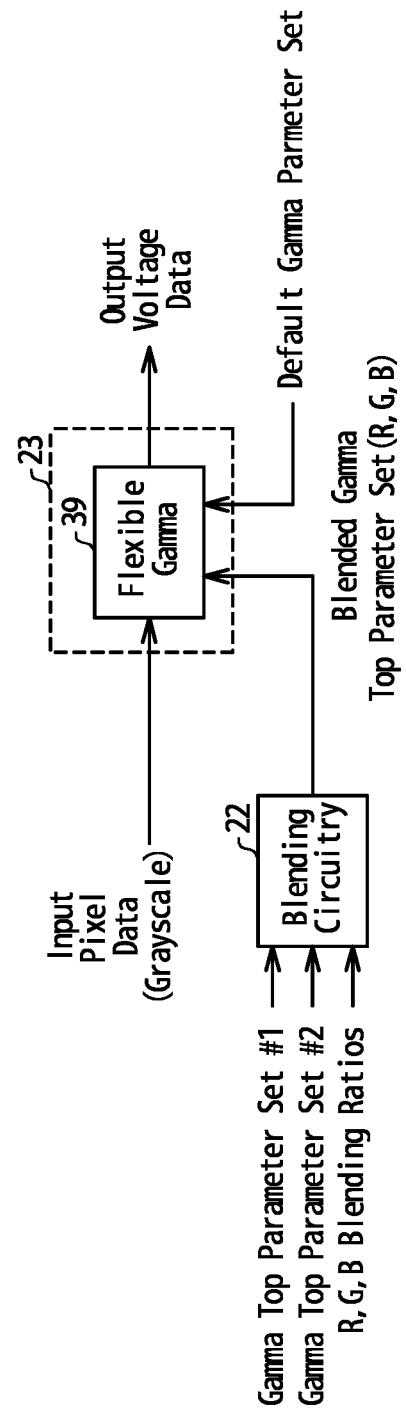
FIG. 18 illustrates an example configuration of an image processing core, according to one or more embodiments.
Figure 19:
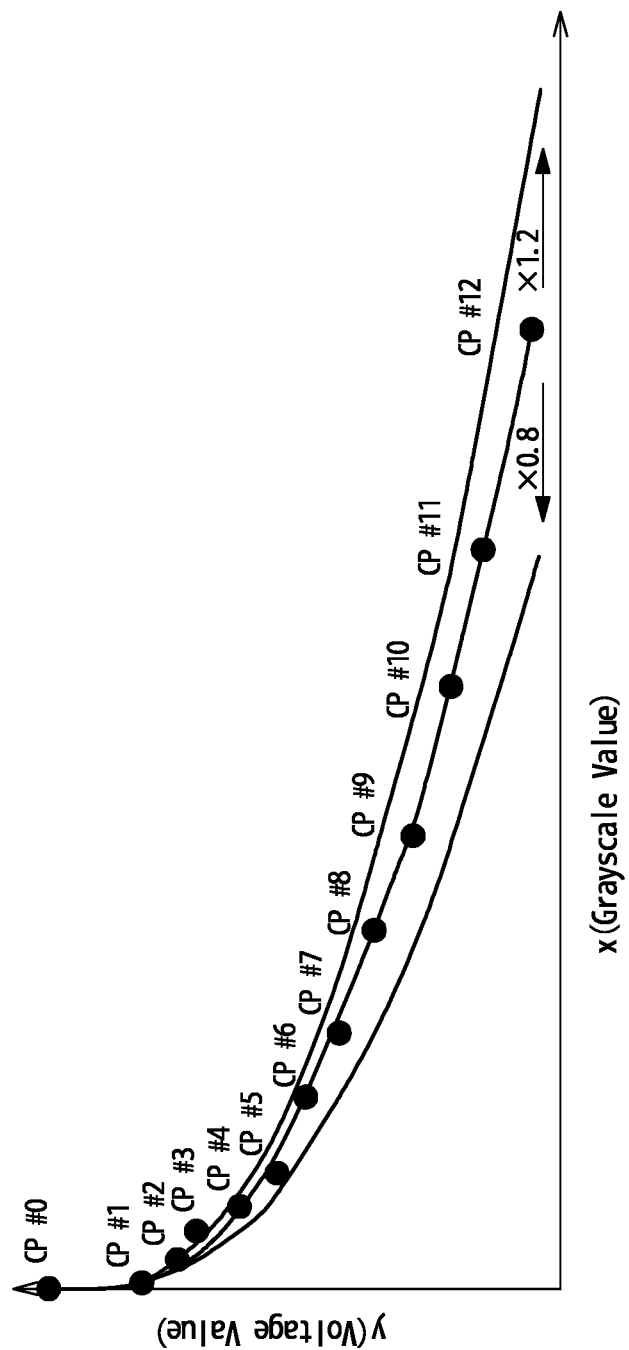
FIG. 19 illustrates an example relationship between control points and a gamma curve, according to one or more embodiments.

FIG. 18 illustrates an example configuration of the image processing core 23, according to still other embodiments in which the image processing core 23 is configured differently from those illustrated in FIGS. 13 and 14, and 15. In the embodiment illustrated, the image processing core 23 comprises flexible gamma circuitry 39. In various embodiments, the flexible gamma circuitry 39 is configured to perform digital gamma processing in accordance with a gamma curve obtained by scaling a default gamma curve based on a gamma top parameter. Referring to FIG. 19, the default gamma curve may be defined with a default gamma parameter set. The default gamma parameter set may describe the positions or coordinates of control points CP #0 to CP #m in a coordinate system defined with a first coordinate axis (the x axis in FIG. 19) and a second coordinate axis (the y axis in FIG. 19), where the first coordinate axis represents the grayscale value, and the second coordinate axis represents the voltage value. The gamma top parameter may indicate a scaling ratio with which the default gamma curve is scaled in the direction of the first coordinate axis. The scaling of the gamma parameter may be achieved by multiplying the coordinates of the control points CP #0 to CP #m in the first coordinate axis (the x coordinates in FIG. 19) by the scaling ratio indicated by the gamma top parameter.

In one or more embodiments, as illustrated in FIG. 18, gamma top parameters are individually given to the flexible gamma circuitry 39 for red, green and blue. The gamma top parameters for red, green, and blue may be hereinafter referred to as R gamma top parameter, G gamma top parameter, and B gamma top parameter, respectively. In various embodiments, a color correction is achieved by individually performing the digital gamma processing for red, green, and blue based on the R, G, and B gamma curves obtained by scaling the default gamma curve based on the R, G, and B gamma top parameters, respectively.

Parameter sets #1 and #2 supplied to the blending circuitry 22 may comprise gamma top parameter sets #1 and #2, respectively, where each of gamma top parameter sets #1 and #2 comprises an R gamma top parameter, a G gamma top parameter, and a B gamma top parameter.

The blending circuitry 22 may be configured to generate a blended gamma top parameter set by blending gamma top parameter sets #1 and #2 based on the R, G, and B blending ratios. The blended gamma top parameter set may comprise a blended R gamma top parameter, a blended G gamma top parameter, and a blended B gamma top parameter. The blending circuitry 22 may be configured to generate the blended R gamma top parameter of the blended gamma top parameter set by blending the R gamma top parameters of gamma top parameter sets #1 and #2 based on the R blending ratio. The blending circuitry 22 may be further configured to generate the blended G gamma top parameter of the blended gamma top parameter set by blending the G gamma top parameters of gamma top parameter sets #1 and #2 based on the G blending ratio. The blending circuitry 22 may be further configured to generate the blended B gamma top parameter of the blended gamma top parameter set by blending the B gamma top parameters of gamma top parameter sets #1 and #2 based on the B blending ratio.

Figure 20:
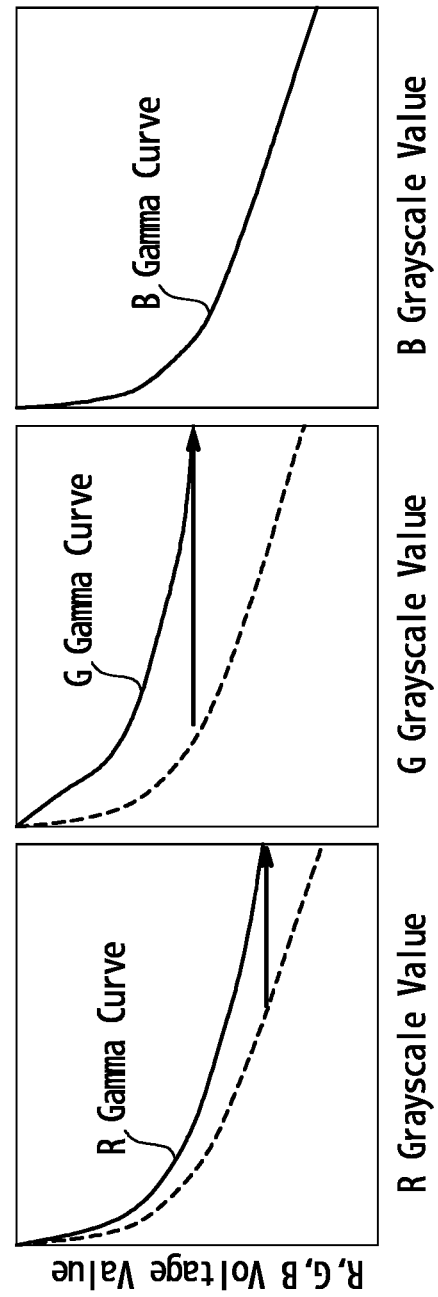
FIG. 20 illustrates an example operation of flexible gamma circuitry, according to one or more embodiments.

FIG. 20 illustrates an example operation of the flexible gamma circuitry 39, according to one or more embodiments. The flexible gamma circuitry 39 may be configured to calculate the R voltage value of the output voltage data from the R grayscale value of the input pixel data through digital gamma processing in accordance with the R gamma curve obtained by scaling the default gamma curve in the direction of the first coordinate axis based on the blended R gamma top parameter of the blended gamma top parameter set. The flexible gamma circuitry 39 may be further configured to calculate the G voltage value of the output voltage data from the G grayscale value of the input pixel data through digital gamma processing in accordance with the G gamma curve obtained by scaling the default gamma curve in the direction of the first coordinate axis based on the blended G gamma top parameter of the blended gamma top parameter set. The flexible gamma circuitry 39 may be further configured to calculate the B voltage value of the output voltage data from the B grayscale value of the input pixel data through digital gamma processing in accordance with the B gamma curve obtained by scaling the default gamma curve in the direction of the first coordinate axis based on the blended B gamma top parameter of the blended gamma top parameter set. In various embodiments, a color correction is achieved by performing digital gamma processing in accordance with the R, G, and B gamma curves obtained individually based on the blended R, G, and B gamma top parameters.

Figure 21:
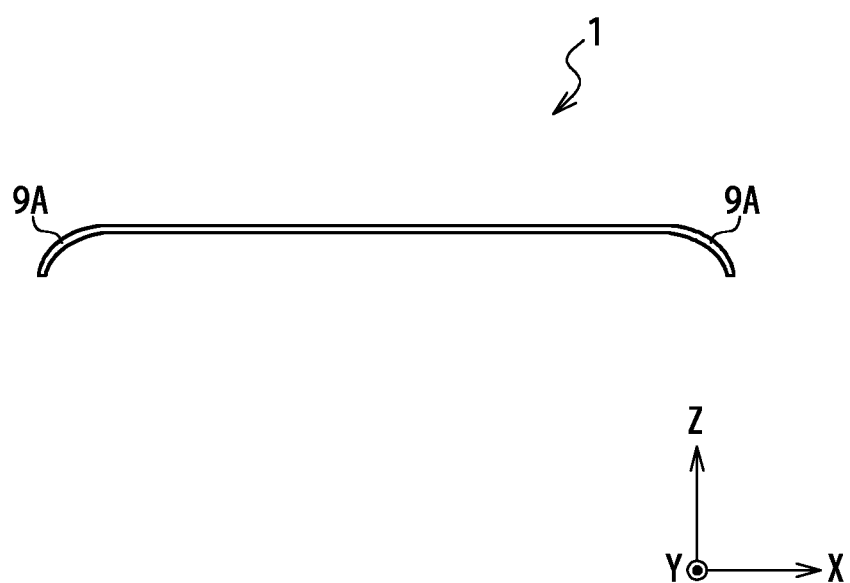
FIG. 21 illustrates an example configuration of a display panel, according to one or more embodiments.

FIGS. 21 and 22 illustrate an example configuration of the display panel 1, according to other embodiments. In the embodiment illustrated in FIGS. 21 and 22, the display panel 1 is bent in the thickness direction in vertical edge areas 9A located at the vertical edges of the display panel 1, where the thickness direction is illustrated as −Z direction in FIG. 21. In such embodiments, the angle between the line-of-sight direction of a user and the nominal direction of the surface of the display panel 1 may vary depending on the position in the vertical edge areas 9A. In some embodiments, as illustrated in FIG. 22, the foldable area 8 partially overlaps the vertical edge areas 9A in overlapping areas 10A.

Figure 23:
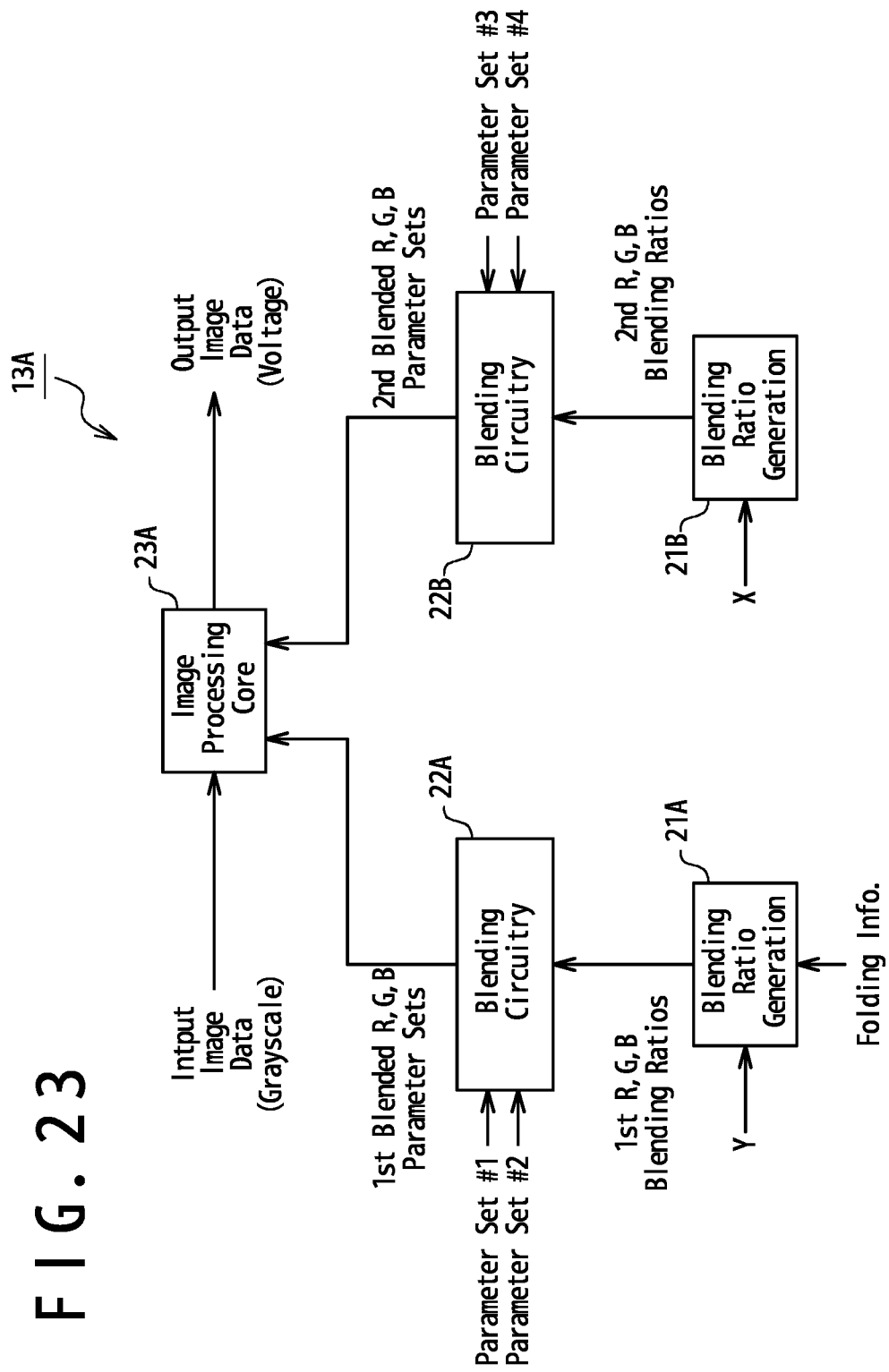
FIG. 23 illustrates an example configuration of image processing circuitry, according to one or more embodiments.

FIG. 23 illustrates an example configuration of image processing circuitry 13A, according to one or more embodiments. In the embodiment illustrated, image processing circuitry 13A is configured to perform image processing to suppress a color shift that potentially results from variations in the angle between the line-of-sight direction of the user and the nominal direction of the surface of the display panel 1 in the foldable area 8 and the vertical edge areas 9A. This may improve the image quality. The image processing circuitry 13A may be configured to perform a first color correction for the foldable area 8 and a second color correction for the vertical edge areas 9A. The first color correction for the foldable area 8 may be based on the position of the pixel 7 of interest in the vertical direction, that is, the Y coordinate of the pixel 7 of interest. The second color correction for the vertical edge areas 9A may be based on the position of the pixel 7 of interest in the horizontal direction, that is, the X coordinate of the pixel 7 of interest. In one or more embodiments, when both the first color correction and the second color correction are performed for a pixel 7, the result of a selected one of the first and second color corrections is used. In such embodiments, the selected one of the first and second color corrections causes lower luminance levels for the subpixels 5 of the pixel 7 compared to the other.

As illustrated in FIG. 23, the image processing circuitry 13A may comprise blending ratio generation circuitry 21A, 21B, blending circuitry 22A, 22B, and an image processing core 23A. The blending ratio generation circuitry 21A and the blending circuitry 22A may be used for the first color correction for the foldable area 8, and the blending ratio generation circuitry 21B and the blending circuitry 22B may be used for the second color correction for the vertical edge areas 9A.

The blending ratio generation circuitry 21A may be configured to generate a first R blending ratio, a first G blending ratio, and a first B blending ratio based on the folding information and the Y coordinate of the pixel 7 of interest, similarly to the blending ratio generation circuitry 21 illustrated in FIG. 3. In some embodiments, the blending ratio generation circuitry 21A may receive, in addition to the folding information, correspondence information indicative of correspondences between the Y coordinate of the pixel 7 of interest and the first R, G, and B blending ratios. The correspondence information may be used as the spatial distribution information in the blending ratio generation circuitry 21A. The blending ratio generation circuitry 21A may comprise an LUT indicative of the correspondences between the Y coordinate of the pixel 7 of interest and the first R, G, and B blending ratios. In such embodiments, the spatial distribution information supplied to the blending ratio generation circuitry 21A may comprise table values of the LUT.

In one or more embodiments, the blending circuitry 22A is configured to generate a first blended R parameter set, a first blended G parameter set, and a first blended B parameter set by blending parameter sets #1 and #2 based on the first R blending ratio, the first G blending ratio, and the first B blending ratio, respectively. The blending circuitry 22A may be configured similarly to the blending circuitry 22 described in relation to the earlier figures.

The blending ratio generation circuitry 21B may be configured to generate a second R blending ratio, a second G blending ratio, and a second B blending ratio based on the X coordinate of the pixel 7 of interest, differently from the blending ratio generation circuitry 21A. In some embodiments, the blending ratio generation circuitry 21B may receive correspondence information indicative of correspondences between the X coordinate of the pixel 7 of interest and the second R, G, and B blending ratios. The blending ratio generation circuitry 21B may comprise an LUT indicative of the correspondences between the X coordinate of the pixel 7 of interest and the second R, G, and B blending ratios. In such embodiments, the spatial distribution information supplied to the blending ratio generation circuitry 21B may comprise table values of the LUT.

In one or more embodiments, the blending circuitry 22B is configured to generate a second blended R parameter set, a second blended G parameter set, and a second blended B parameter set by blending parameter sets #3 and #4 based on the second R blending ratio, the second G blending ratio, and the second B blending ratio, respectively. The blending circuitry 22B may be configured similarly to the blending circuitry 22 described in relation to the earlier figures.

In various embodiments, the image processing core 23A is configured to generate the R, G, and B voltage values of the output voltage data from the R, G, and B grayscale values of the input pixel data, respectively, by performing image processing based on the blended parameter sets received from the blending circuitry 22A and 22B. The image processing core 23A may be configured similarly to any one of image processing cores 23 illustrated in FIGS. 13, 14, 15, and 18. The image processing core 23A may be configured to generate first R, G, and B voltage values by performing the first color correction on the R, G, and B grayscale values of the input pixel data based on the first blended R, G, and B parameter sets, respectively. For a pixel 7 located in the foldable area 8 but not in the vertical edge areas 9A, the first R, G, and B voltage values may be used as the R, G, and B voltage values of the output voltage data.

In various embodiments, the image processing core 23A may be further configured to generate second R, G, and B voltage values by performing the second color correction on the R, G, and B grayscale values of the input pixel data based on the second blended R, G, and B parameter sets, respectively. For a pixel 7 located in vertical edge areas 9A but not in the foldable area 8, the second R, G, and B voltage values may be used as the R, G, and B voltage values of the output voltage data.

For the overlapping areas 10A in which the foldable area 8 and the vertical edge areas 9A overlap each other, the image processing core 23A may be configured to select one of the first and second R voltage values which causes a lower luminance level for the R subpixel 5R as compared to the other as the R voltage value of the output voltage data, select one of the first and second G voltage values which causes a lower luminance level for the G subpixel 5G as compared to the other as the G voltage value of the output voltage data, and select one of the first and second B voltage values which causes a lower luminance level for the B subpixel 5B as compared to the other as the B voltage value of the output voltage data. The thus-described selection of the R, G, and B voltage values of the output voltage data may obtain a smoothed image.

FIG. 24 illustrates an example configuration of the display panel 1 in still other embodiments. In the embodiment illustrated, first and second partial areas 8A and 8B that partially overlap each other are defined in the foldable area 8. In some embodiments, the first partial area 8A and the second partial area 8B are shifted from each other in the vertical direction.

Figure 25:
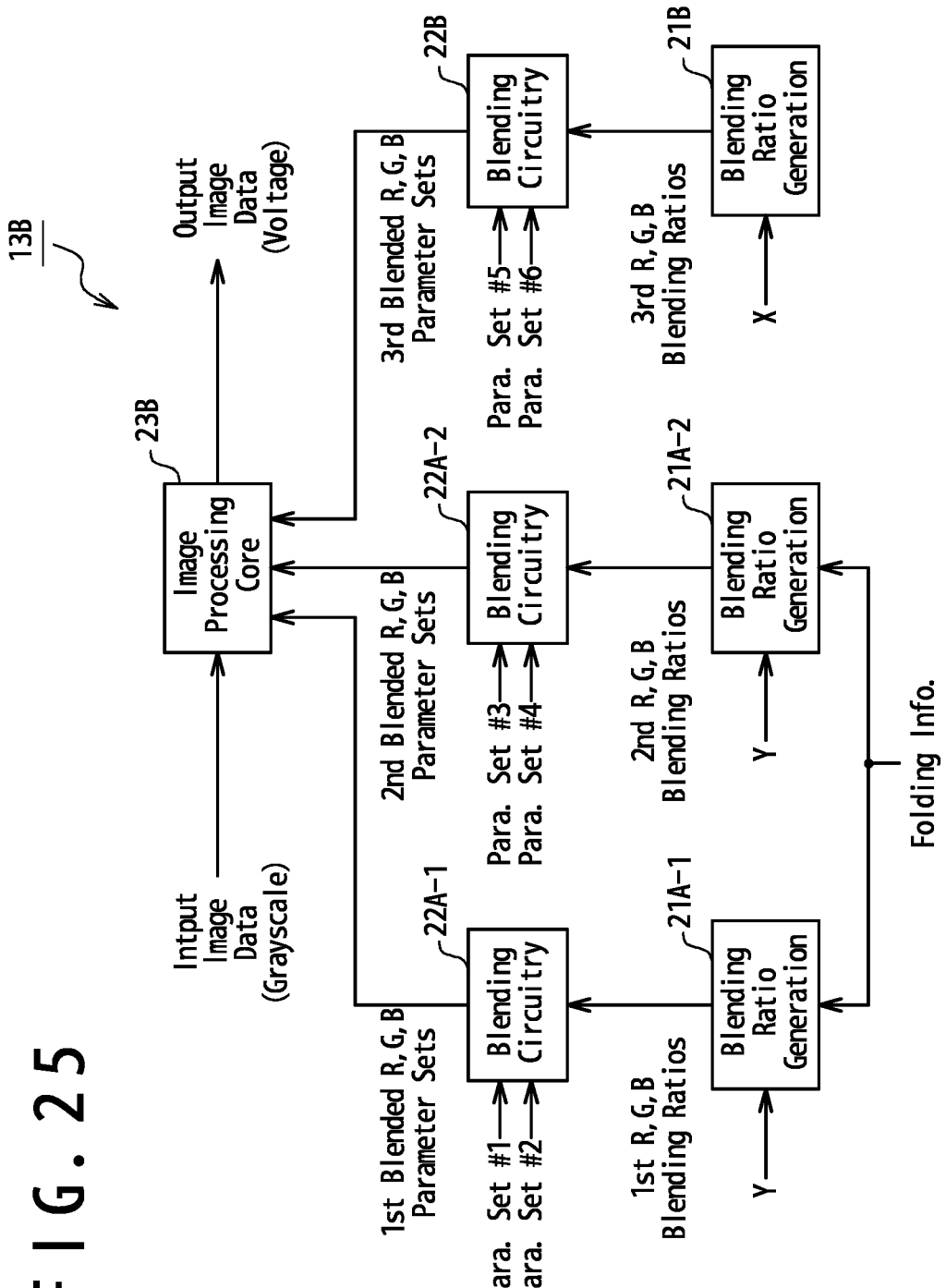
FIG. 25 illustrates an example configuration of image processing circuitry, according to one or more embodiments.

FIG. 25 illustrates an example configuration of image processing circuitry 13B adapted to the display panel 1 illustrated in FIG. 24, according to one or more embodiments. In the embodiment illustrated, image processing circuitry 13B is configured to perform a first color correction for the first partial area 8A, a second color correction for the second partial area 8B, and a third color correction for the vertical edge areas 9A. In various embodiments, the first and second color corrections for the first and second partial areas 8A and 8B are based on the position of the pixel 7 of interest in the vertical direction, that is, the Y coordinate of the pixel 7. In various embodiments, the third color correction for the vertical edge areas 9A is based on the position of the pixel 7 in the horizontal direction, that is, the X coordinate of the pixel 7. In some embodiments, when both the first and second color corrections, which are both based on the position of the pixel 7 in the vertical direction, are performed, the result of a selected one of the first and second color corrections is used, the selected one causing higher luminance levels for the subpixels 5 of the pixel 7 compared to the other.

The image processing circuitry 13B may comprise blending ratio generation circuitry 21A-1, 21A-2, 21B, blending circuitry 22A-1, 22A-2, 22B, and an image processing core 23B. The blending ratio generation circuitry 21A-1 and the blending circuitry 22A-1 may be used for the first color correction for the first partial area 8A of the foldable area 8. The blending ratio generation circuitry 21A-2 and the blending circuitry 22A-2 may be used for the second color correction for the second partial area 8B of the foldable area 8. The blending ratio generation circuitry 21B and the blending circuitry 22B may be used for the third color correction for the vertical edge areas 9A.

The blending ratio generation circuitry 21A-1 may be configured to generate a first R blending ratio, a first G blending ratio, and a first B blending ratio based on the folding information and the Y coordinate of the pixel 7 of interest. The blending circuitry 22A-1 may be configured to generate a first blended R parameter set, a first blended G parameter set, and a first blended B parameter set by blending parameter sets #1 and #2 based on the first R blending ratio, the first G blending ratio, and the first B blending ratio, respectively.

The blending ratio generation circuitry 21A-2 may be configured to generate a second R blending ratio, a second G blending ratio, and a second B blending ratio based on the folding information and the Y coordinate of the pixel 7 of interest. The blending circuitry 22A-2 may be configured to generate a second blended R parameter set, a second blended G parameter set, and a second blended B parameter set by blending parameter sets #3 and #4 based on the second R blending ratio, the second G blending ratio, and the second B blending ratio, respectively.

The blending ratio generation circuitry 21B may be configured to generate a third R blending ratio, a third G blending ratio, and a third B blending ratio based on the X coordinate of the pixel 7 of interest. The blending circuitry 22B may be configured to generate a third blended R parameter set, a third blended G parameter set, and a third blended B parameter set by blending parameter sets #5 and #6 based on the third R blending ratio, the third G blending ratio, and the third B blending ratio, respectively.

In various embodiments, the image processing core 23B is configured to generate the R, G, and B voltage values of the output voltage data from the R, G, and B grayscale values of the input pixel data, respectively, by performing image processing based on the blended parameter sets received from the blending circuitry 22A-1, 22A-2 and 22B. The image processing core 23B may be configured similarly to any one of image processing cores 23 illustrated in FIGS. 13, 14, 15, and 18.

The image processing core 23B may be configured to generate first R, G, and B voltage values by performing the first color correction on the R, G, and B grayscale values of the input pixel data based on the first blended R, G, and B parameter sets, respectively. For a pixel 7 located in the first partial area 8A but not in the second partial area 8B and the vertical edge areas 9A, the first R, G, and B voltage values may be used as the R, G, and B voltage values of the output voltage data.

The image processing core 23B may be further configured to generate second R, G, and B voltage values by performing the second color correction on the R, G, and B grayscale values of the input pixel data based on the second blended R, G, and B parameter sets, respectively. For a pixel 7 located in the second partial area 8B but not in the first partial area 8A and the vertical edge areas 9A, the second R, G, and B voltage values may be used as the R, G, and B voltage values of the output voltage data.

The image processing core 23B may be further configured to generate third R, G, and B voltage values by performing the third color correction on the R, G, and B grayscale values of the input pixel data based on the third blended R, G, and B parameter sets, respectively. For a pixel 7 located in the vertical edge areas 9A but not in the foldable area 8, the third R, G, and B voltage values may be used as the R, G, and B voltage values of the output voltage data.

In one or more embodiments, for the overlapping areas 10A in which the foldable area 8 and the vertical edge areas 9A overlap each other, the image processing core 23B may be configured to: select one of the first, second, and third R voltage values as the R voltage value of the output voltage data, the one causing the lowest luminance level for the R subpixel 5R; select one of the first, second, and third G voltage values as the G voltage value of the output voltage data, the one causing the lowest luminance level for the G subpixel 5G; and select one of the first, second, and third B voltage values as the B voltage value of the output voltage data, the one causing the lowest luminance level for the B subpixel 5B. The thus-described selection of the R, G, and B voltage values of the output voltage data may obtain a smoothed image.

For an area 10B in which the first and second partial areas 8A and 8B of the foldable area 8 overlap outside the vertical edge areas 9A, the image processing core 23B may be configured to: select one of the first and second R voltage values as the R voltage value of the output voltage data, the selected one causing the higher luminance level for the R subpixel 5R; select one of the first and second G voltage values as the G voltage value of the output voltage data, the selected one causing the higher luminance level for the G subpixel 5G; and select one of the first and second B voltage values as the B voltage value of the output voltage data, the selected one causing the higher luminance level for the B subpixel 5B. The thus-described selection of the R, G, and B voltage values of the output voltage data may obtain a smoothed image.

FIG. 26 illustrates an example configuration of the display panel 1, according to still other embodiments. In the embodiment illustrated, the display panel 1 is bent in the thickness direction in vertical edge areas 9A located at the vertical edges of the display panel 1 and in horizontal edge areas 9B located at the horizontal edges of the display panel 1, where the thickness direction is illustrated as —Z direction in FIG. 26. In such embodiments, the angle between the line-of-sight direction of a user and the nominal direction of the surface of the display panel 1 may vary depending on the position in the vertical edge areas 9A and the horizontal edge areas 9B. In one or more embodiments, the vertical edge areas 9A and the horizontal edge areas 9B partially overlap at corner areas 10C. While no foldable area 8 is disposed in the embodiment illustrated in FIG. 26, the display panel 1 may further comprise a foldable area 8.

Figure 27:
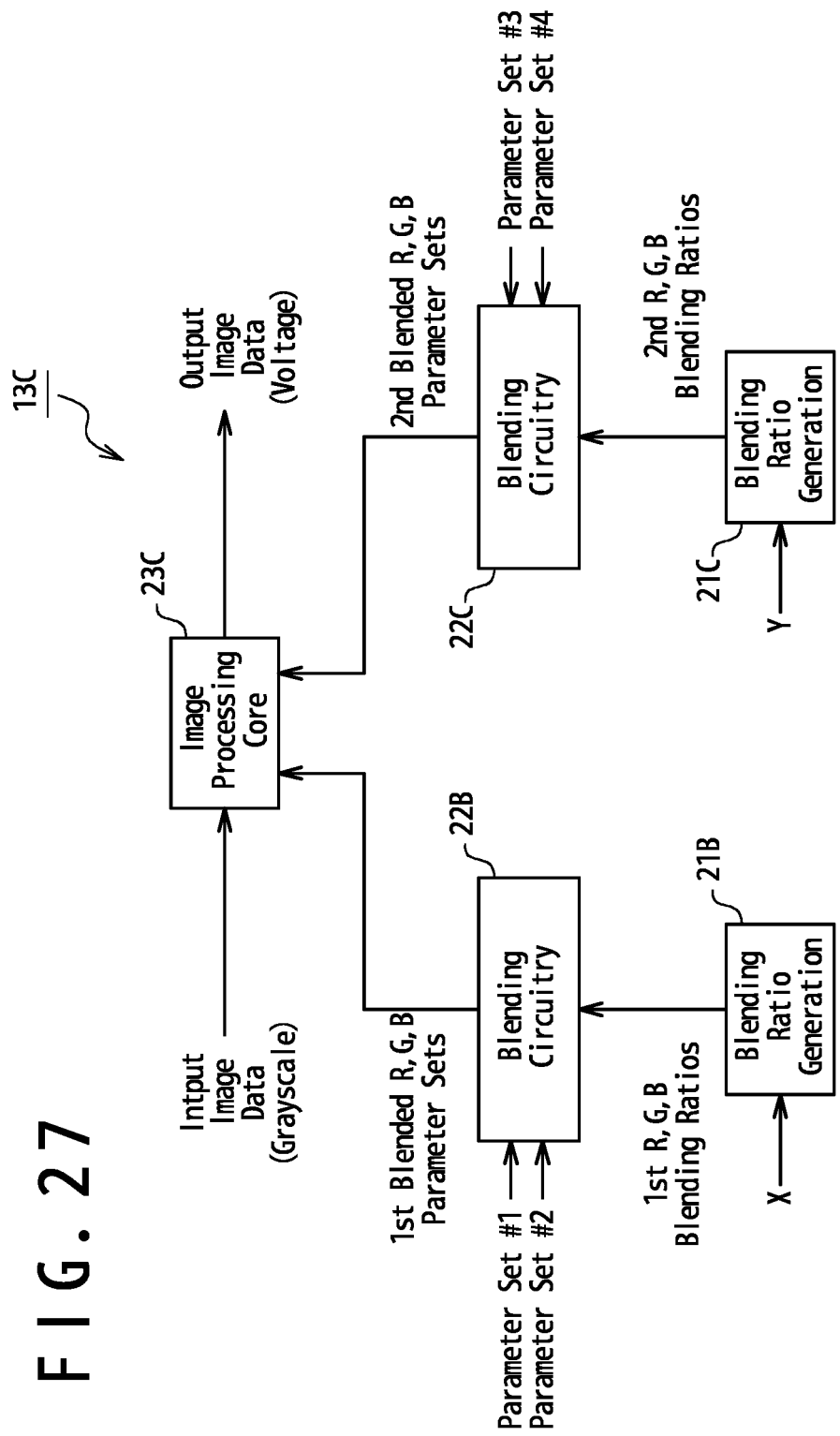
FIG. 27 illustrates an example configuration of image processing circuitry, according to one or more embodiments.

FIG. 27 illustrates an example configuration of image processing circuitry 13C adapted to the display panel 1 illustrated in FIG. 26, according to one or more embodiments. In the embodiment illustrated, the image processing circuitry 13C is configured to perform a first color correction for the vertical edge areas 9A and a second color correction for the horizontal edge areas 9B. The image processing circuitry 13C may comprise blending ratio generation circuitry 21B, 21C, blending circuitry 22B, 22C, and an image processing core 23C. The blending ratio generation circuitry 21B and the blending circuitry 22B may be used for the first color correction for the vertical edge areas 9A, and the blending ratio generation circuitry 21C and the blending circuitry 22C may be used for the second color correction for the horizontal edge areas 9B. The first color correction for the vertical edge areas 9A may be based on the position of the pixel 7 of interest in the horizontal direction, that is, the X coordinate of the pixel 7. The second color correction for the horizontal edge areas 9B may be based on the position of the pixel 7 of interest in the vertical direction, that is, the Y coordinate of the pixel 7. In one or more embodiments, when both the first and second color corrections are performed for a pixel 7, the result of a selected one of the first and second color corrections is used, the selected one causing lower luminance levels for the subpixels 5 of the pixel 7 compared to the other.

The blending ratio generation circuitry 21B may be configured to generate a first R blending ratio, a first G blending ratio, and a first B blending ratio based on the folding information and/or the X coordinate of the pixel 7 of interest. In such embodiments, the blending circuitry 22B may be configured to generate a first blended R parameter set, a first blended G parameter set, and a first blended B parameter set by blending parameter sets #1 and #2 based on the first R blending ratio, the first G blending ratio, and the first B blending ratio, respectively. The blending ratio generation circuitry 21C may be configured to generate a second R blending ratio, a second G blending ratio, and a second B blending ratio based on the folding information and/or the Y coordinate of the pixel 7 of interest. In such embodiments, the blending circuitry 22C may be configured to generate a second blended R parameter set, a second blended G parameter set, and a second blended B parameter set by blending parameter sets #3 and #4 based on the second R blending ratio, the second G blending ratio, and the second B blending ratio, respectively. The blending circuitry 22B and the blending circuitry 22C may be configured similarly to the blending circuitry 22 described in relation to the earlier figures.

In some embodiments, spatial distribution information received by the blending ratio generation circuitry 21B may comprise first correspondence information indicative of correspondences between the X coordinate of the pixel 7 of interest and the first R, G, and B blending ratios. The blending ratio generation circuitry 21B may comprise an LUT indicative of the correspondences between the X coordinate of the pixel 7 of interest and the first R, G, and B blending ratios. In such embodiments, the spatial distribution information supplied to the blending ratio generation circuitry 21B may comprise table values of the LUT.

In some embodiments, spatial distribution information received by the blending ratio generation circuitry 21C may comprise second correspondence information indicative of correspondences between the Y coordinate of the pixel 7 of interest and the second R, G, and B blending ratios, differently from the blending ration generator circuitry 21B. The blending ratio generation circuitry 21C may comprise an LUT indicative of the correspondences between the Y coordinate of the pixel 7 of interest and the second R, G, and B blending ratios. In such embodiments, the spatial distribution information supplied to the blending ratio generation circuitry 21C may comprise table values of the LUT.

In various embodiments, the image processing core 23C is configured to generate the R, G, and B voltage values of the output voltage data from the R, G, and B grayscale values of the input pixel data, respectively, by performing image processing based on the blended parameter sets received from the blending circuitry 22B and 22C.

The image processing core 23C may be configured to generate first R, G, and B voltage values by performing the first color correction on the R, G, and B grayscale values of the input pixel data based on the first blended R, G, and B parameter sets, respectively. The image processing core 23C may be further configured to generate second R, G, and B voltage values from the R, G, and B grayscale values of the input pixel data, by performing the second color correction based on the second blended R, G, and B parameter sets, respectively. In some embodiments, the image processing core 23C may be configured to: select one of the first and second R voltage values as the R voltage value of the output voltage data, the selected one causing the lower luminance level for the R subpixel 5R; select one of the first and second G voltage values as the G voltage value of the output voltage data, the selected one causing the lower luminance level for the G subpixel 5G; and select one of the first and second B voltage values as the B voltage value of the output voltage data, the selected one causing the lower luminance level for the B subpixel 5B. The thus-described selection of the R, G, and B voltage values of the output voltage data may obtain a smoothed image.

Figure 28:
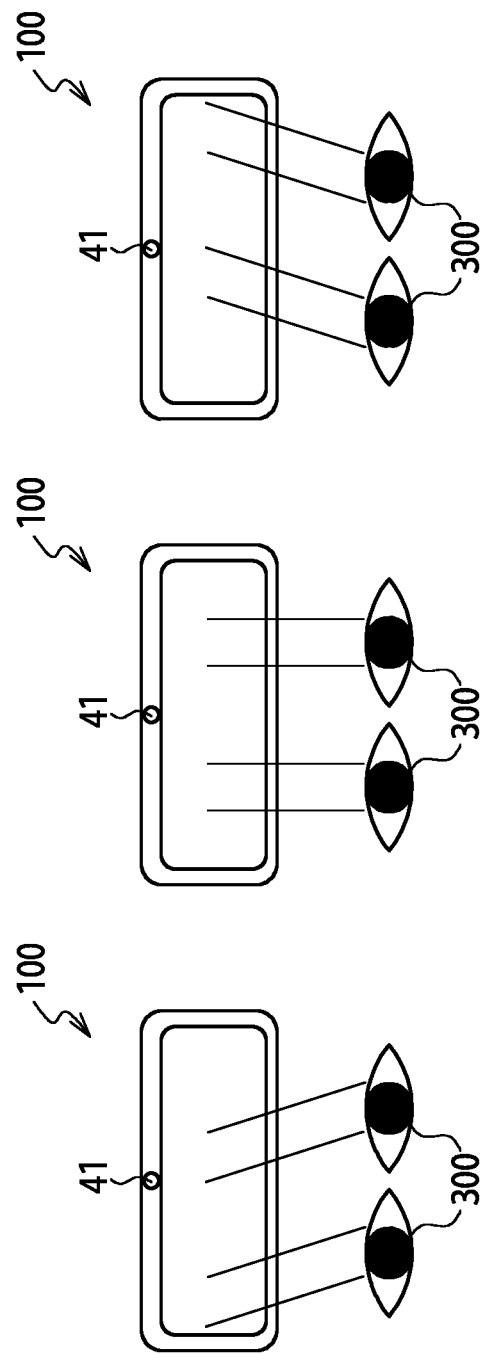
FIG. 28 illustrates an example configuration of a display system, according to one or more embodiments.

In a display system in which user's eyes observing the display panel 1 are located close to the display panel 1, the line-of-sight direction to the display panel 1 may vary depending on the positions of the user's eyes in addition to the position of the pixel 7 of interest on the display panel 1. This may apply to a display system incorporated in a head mount display (HMD) of a vertical reality (VR) system. FIG. 28 illustrates an example configuration of such a display system, according to one or more embodiments. In the embodiment illustrated, a camera 41 is provided for the display system that comprises the display module 100, and a color correction is performed based on the positions of user's eyes 300 determined based on a camera image captured by the camera 41 to reduce or suppress a color shift that potentially results from variations in the line-of-sight direction.

Figure 29:
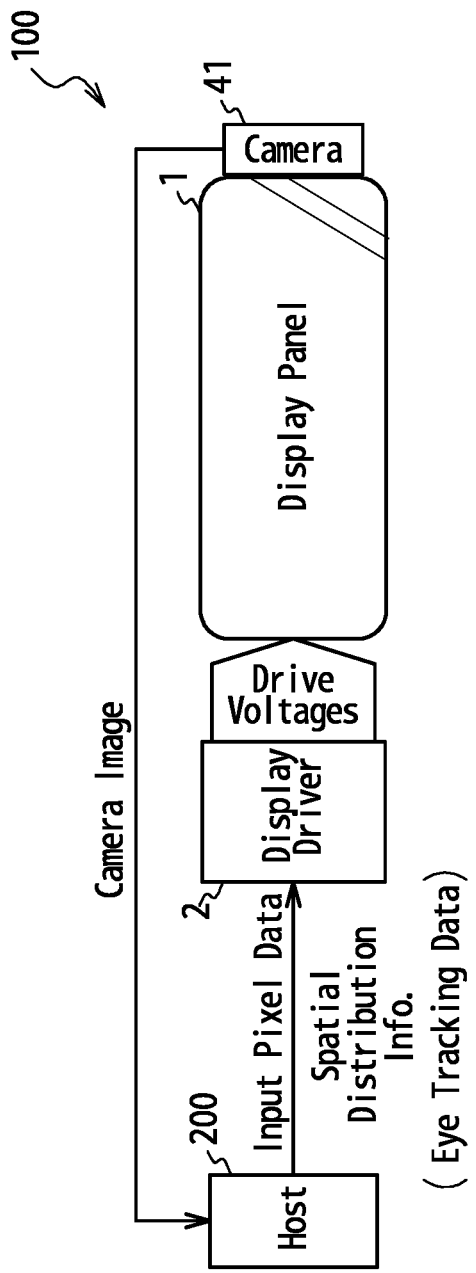
FIG. 29 illustrates an example configuration of a display system, according to one or more embodiments.

FIG. 29 illustrates a detailed example configuration of the display system illustrated in FIG. 28, according to one or more embodiments. In the embodiment illustrated, a host 200 is configured to achieve eye tracking based on the camera image captured by the camera 41 to generate eye tracking data of the user. The eye tracking data may indicate the positions of the user's eyes 300 and/or the line-of-sight direction. In one or more embodiments, spatial distribution information sent from the host 200 to the display driver 2 comprises the eye tracking data. In such embodiments, the image processing circuitry 13 of the display driver 2 may be configured to apply image processing to the input pixel data based on the eye tracking data to generate the output voltage data. In embodiments where the eye tracking data is supplied to the image processing circuitry 13 configured as illustrated in FIG. 3 in place of or in addition to the folding information, the image processing circuitry 13 may be configured to generate R, G, and B blending ratios based on the eye tracking data in place of or in addition to the folding information, generate a blended parameter set based on the R, G and B blending ratios, and perform the image processing based on the blended parameter set.

Figure 30:
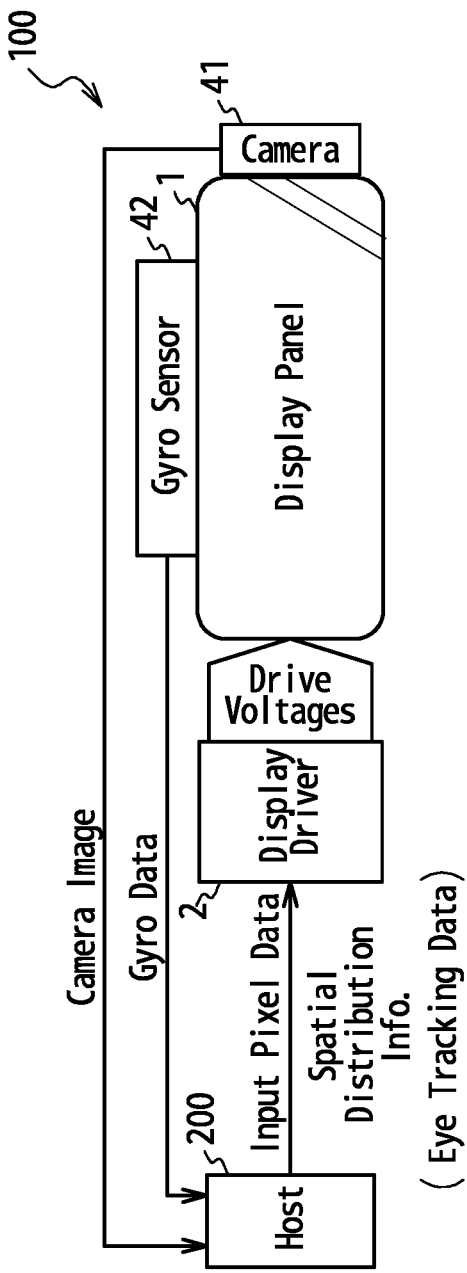
FIG. 30 illustrates an example configuration of a display system, according to one or more embodiments.

FIG. 30 illustrates an example configuration of a modified display system, according to other embodiments. In the embodiment illustrated, the display system comprises a gyro sensor 42 in addition to the display module 100, and gyro data indicative of the attitude of the display system is sent to the host 200. In such embodiments, the host 200 may be configured to generate the eye tracking data through eye tracking based on the gyro data and the camera image captured by the camera 41. The image processing circuitry 13 of the display driver 2 may be configured to generate R, G, and B blending ratios based on the eye tracking data, generate a blended parameter set based on the R, G and B blending ratios, and perform the image processing based on the blended parameter set.

Figure 31:
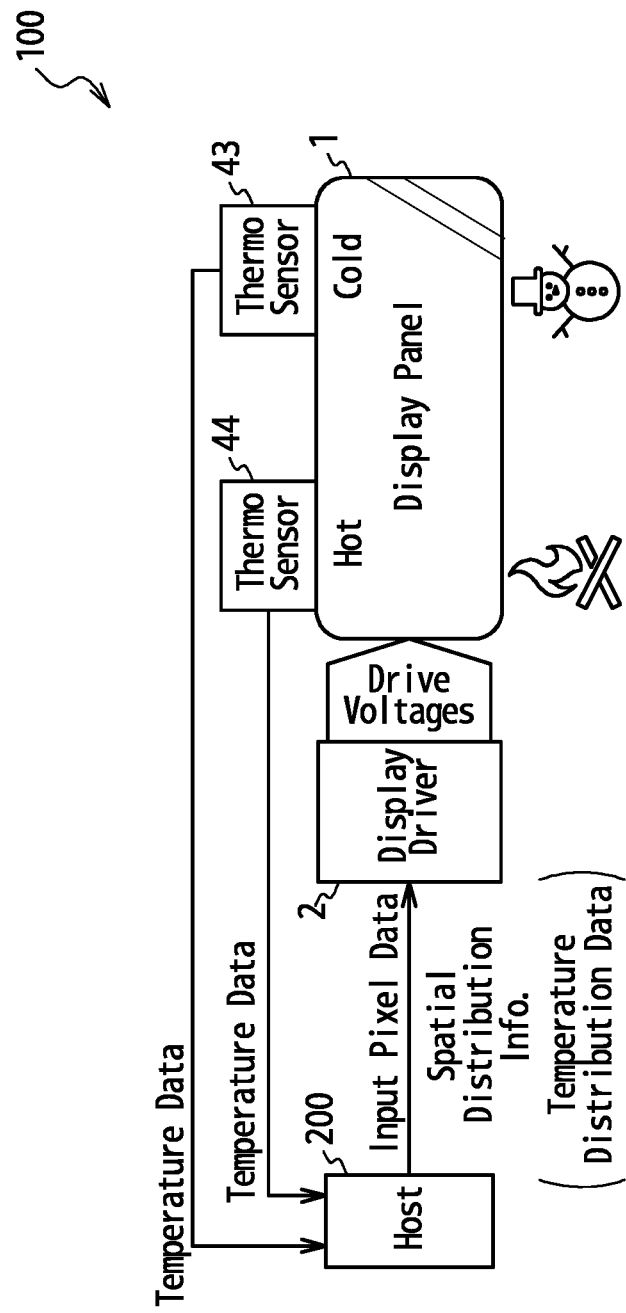
FIG. 31 illustrates an example configuration of a display system, according to one or more embodiments.

FIG. 31 illustrates an example configuration of a display system, according to still other embodiments. In the embodiment illustrated, the display system comprises a plurality of thermo-sensors 43 and 44 in addition to the display module 100, and temperature data indicative of temperatures measured by the thermo-sensors 43 and 44 is sent to the host 200. The host 200 may be configured to analyze the temperature data and generate temperature distribution data corresponding to the temperature distribution. In such embodiments, the image processing circuitry 13 of the display driver 2 may be configured to generate the output voltage data by performing image processing on the input pixel data based on the temperature distribution data. In one or more embodiments, the temperature distribution data is supplied to the image processing circuitry 13 configured as illustrated in FIG. 3 in place of or in addition to the folding information. In such embodiments, the image processing circuitry 13 may be configured to generate R, G, and B blending ratios based on the temperature distribution data in place of or in addition to the folding information, generate a blended parameter set based on the R, G and B blending ratios, and perform the image processing based on the blended parameter set.

Figure 32:
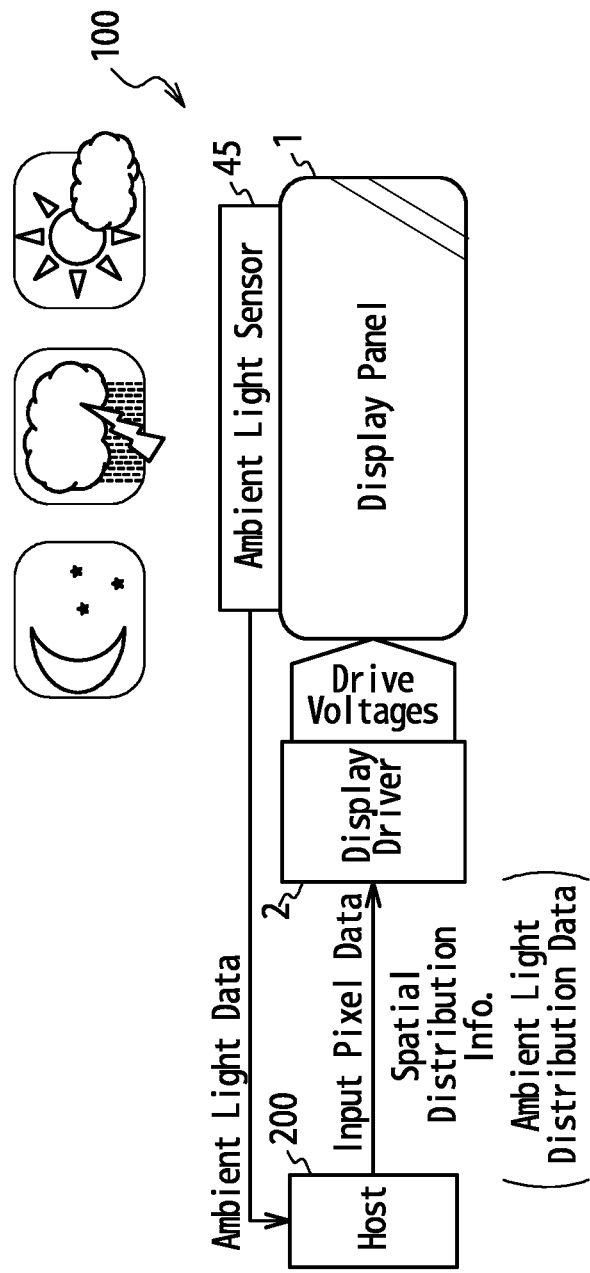
FIG. 32 illustrates an example configuration of a display system, according to one or more embodiments.

FIG. 32 illustrates an example configuration of a display system, according to still other embodiments. In the embodiment illustrated, the display system comprises an ambient light sensor 45 in addition to the display module 100, and ambient light data obtained by the ambient light sensor 45 is sent to the host 200. In such embodiments, the host 200 may be configured to analyze the ambient light data and generate ambient light distribution data corresponding to the luminance distribution of the ambient light on the display panel 1. The image processing circuitry 13 of the display driver 2 may be configured to generate the output voltage data by performing image processing on the input pixel data based on the ambient light distribution data. In one or more embodiments, the ambient light distribution data is supplied to the image processing circuitry 13 configured as illustrated in FIG. 3 in place of or in addition to the folding information. In such embodiments, the image processing circuitry 13 may be configured to generate R, G, and B blending ratios based on the ambient light distribution data in place of or in addition to the folding information, generate a blended parameter set based on the R, G and B blending ratios, and perform the image processing based on the blended parameter set.

Figure 33:
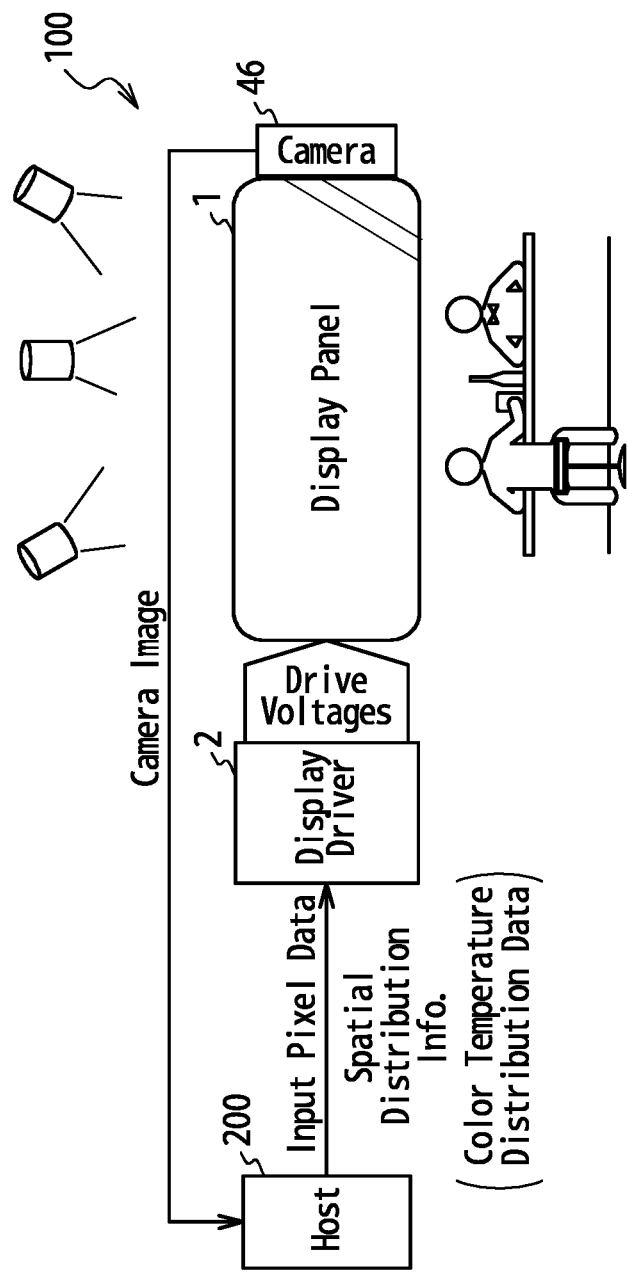
FIG. 33 illustrates an example configuration of a display system, according to one or more embodiments.

FIG. 33 illustrates an example configuration of a display system, according to still other embodiments. In the embodiment illustrated, the display system comprises a camera 46 in addition to the display module 100, and a camera image captured by the camera 46 is sent to the host 200. In such embodiments, the host 200 may be configured to analyze the camera image and generate color temperature distribution data corresponding to a color temperature distribution of the ambient light on the display panel 1. The image processing circuitry 13 of the display driver 2 may be configured to generate the output voltage data by performing image processing on the input pixel data based on the color temperature distribution data. In one or more embodiments, the color temperature distribution data is supplied to the image processing circuitry 13 configured as illustrated in FIG. 3 in place of or in addition to the folding information. In such embodiments, the image processing circuitry 13 may be configured to generate R, G, and B blending ratios based on the color temperature distribution data in place of or in addition to the folding information, generate a blended parameter set based on the R, G and B blending ratios, and perform the image processing based on the blended parameter set.

While various embodiments have been specifically described in the above, a person skilled in the art would appreciate that the technologies disclosed herein may be implemented with various modifications.

What is claimed is:

1. A display driver comprising:
   image processing circuitry configured to:
   receive ambient light distribution data defining a distribution of ambient light on a display panel, wherein the display panel is foldable between a folded position and an unfolded position;
   receive folding information generated in response to the display panel being in the folded position;
   obtain a blending ratio for each subpixel of a pixel of the display panel using the ambient light distribution data and the folding information;
   generate a blended parameter set for each subpixel by blending a plurality of parameter sets based on a position of the pixel and the blending ratio;
   perform image processing of input pixel data using the blended parameter set to generate output voltage data; and
   drive circuitry configured to drive the display panel based on the output voltage data.

2. The display driver of claim 1, wherein obtaining the blending ratio comprises;
   determining a free-form curve that represents a correspondence between a position in the display panel and the blending ratio, and
   determining the blending ratio based on the free-form curve.

3. The display driver of claim 1, wherein obtaining the blending ratio comprises:
   determining a quadratic curve that represents a correspondence between a position in the display panel and the blending ratio, and
   determining the blending ratio based on the quadratic curve.

4. The display driver of claim 1, wherein obtaining the blending ratio comprises:
   determining a set of control points defining a free-form curve that represents a correspondence between a position in the display panel and a curvature of the display panel,
   determining the curvature of the display panel based on the free-form curve, and
   determining the blending ratio based on the determined curvature.

5. The display driver of claim 4, wherein the free-form curve comprises a Bezier curve.

6. The display driver of claim 1, wherein the display panel comprises first and second areas that partially overlap each other,
   wherein the image processing circuitry is further configured to:
   when the pixel is positioned in the first area, generate a first blended parameter set for each of the subpixels by blending a plurality of first parameter sets based on the ambient light distribution data and the position of the pixel in a first direction of the display panel;
   when the pixel is positioned in the second area, generate a second blended parameter set for each of the subpixels by blending a plurality of second parameter sets based on the ambient light distribution data and the position of the pixel in a second direction orthogonal to the first direction; and
   generate the output voltage data based on one of the first blended parameter set and the second blended parameter set when the pixel is positioned in an area overlapping the first area and the second area, the one of the first blended parameter set and the second blended parameter set causing a lower luminance level for a corresponding one of the subpixels of the pixel compared to the other.

7. The display driver of claim 1, wherein the display panel comprises first and second areas that partially overlap each other,
   wherein the image processing circuitry is further configured to:
   when the pixel is positioned in the first area, generate a first blended parameter set for each of the subpixels by blending a plurality of first parameter sets based on the ambient light distribution data and the position of the pixel in a first direction of the display panel;
   when the pixel is positioned in the second area, generate a second blended parameter set for each of the subpixels by blending a plurality of second parameter sets based on the ambient light distribution data and the position of the pixel in the first direction of the display panel; and
   generate the output voltage data based on one of the first blended parameter set and the second blended parameter set when the pixel is positioned in an area overlapping the first area and the second area, the one of the first blended parameter set and the second blended parameter set causing a higher luminance level for a corresponding one of the subpixels of the pixel, compared to the other.

8. The display driver of claim 1, wherein the image processing circuitry is further configured to receive eye tracking data of a user observing the display panel, wherein the blending ratio is further obtained using the eye tracking data.

9. The display driver of claim 8, wherein the eye tracking data is generated based on a camera image captured by a camera.

10. The display driver of claim 8, wherein the eye tracking data is generated based on a camera image captured by a camera and gyro data obtained by a gyro sensor.

11. A display system comprising:
    a camera configured to capture a camera image;
    a host configured to analyze the camera image and generate color temperature distribution data corresponding to a color temperature distribution of ambient light on a display panel;
    image processing circuitry configured to:
    receive the color temperature distribution data from the host;
    obtain a blending ratio for each subpixel of a pixel of the display panel using the color temperature distribution data,
    generate a blended parameter set for each subpixel by blending a plurality of parameter sets based on a position of the pixel and the blending ratio,
    perform image processing of input pixel data using the blended parameter set to generate output voltage data; and
    drive circuitry configured to drive the display panel based on the output voltage data.

12. The display system of claim 11, wherein the display panel is foldable between a folded position and an unfolded position, and wherein the image processing circuitry is further configured to receive folding information generated in response to the display panel being positioned in the folded position, wherein the blending ratio is further obtained using the folding information.

13. The display system of claim 11, wherein obtaining the blending ratio comprises:
   determining a free-form curve that represents a correspondence between a position in the display panel and the blending ratio, and
   determining the blending ratio based on the free-form curve.

14. The display system of claim 11, wherein obtaining the blending ratio comprises:
   determining a quadratic curve that represents a correspondence between a position in the display panel and the blending ratio, and
   determining the blending ratio based on the quadratic curve.

15. The display system of claim 11, wherein obtaining the blending ratio comprises:
   determining a set of control points defining a free-form curve that represents a correspondence between a position in the display panel and a curvature of the display panel,
   determining the curvature of the display panel based on the free-form curve, and
   determining the blending ratio based on the determined curvature.

16. The display system of claim 11, wherein the image processing circuitry is further configured to receive eye tracking data of a user observing the display panel, wherein the blending ratio is further obtained using the eye tracking data.

17. A display driver comprising:
   image processing circuitry configured to:
      receive ambient light distribution data defining a distribution of ambient light on a display panel;
      receive eye tracking data of a user observing the display panel;
      obtain a blending ratio for each subpixel of a pixel of the display panel using the ambient light distribution data and the eye tracking data;
      generate a blended parameter set for each subpixel by blending a plurality of parameter sets based on a position of the pixel and the blending ratio;
      perform image processing of input pixel data using the blended parameter set to generate output voltage data; and
   drive circuitry configured to drive the display panel based on the output voltage data.

18. The display driver of claim 17, wherein the eye tracking data is generated based on a camera image captured by a camera.

19. The display driver of claim 17, wherein the eye tracking data is generated based on a camera image captured by a camera and gyro data obtained by a gyro sensor.

* * * * *